US011679988B2

(12) United States Patent
Renner et al.

(10) Patent No.: US 11,679,988 B2
(45) Date of Patent: Jun. 20, 2023

(54) AMMONIA SYNTHESIS USING PLASMA-PRODUCED ELECTRONS

(71) Applicant: Case Western Reserve University, Cleveland, OH (US)

(72) Inventors: Julie Renner, Cleveland, OH (US); R. Mohan Sankaran, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 324 days.

(21) Appl. No.: 16/363,548

(22) Filed: Mar. 25, 2019

(65) Prior Publication Data

US 2019/0292063 A1 Sep. 26, 2019

Related U.S. Application Data

(60) Provisional application No. 62/647,021, filed on Mar. 23, 2018.

(51) Int. Cl.
*C01C 1/04* (2006.01)
*C25B 1/04* (2021.01)
(Continued)

(52) U.S. Cl.
CPC .............. *C01C 1/0494* (2013.01); *C25B 1/04* (2013.01); *C25B 11/02* (2013.01); *C25B 11/061* (2021.01); *C25B 11/081* (2021.01); *C25B 15/02* (2013.01)

(58) Field of Classification Search
CPC ....... C25B 11/061; C25B 11/081; C25B 1/04; C25B 11/02; C25B 15/02; C25B 9/19; (Continued)

(56) References Cited

U.S. PATENT DOCUMENTS 8,529,749 B2 9/2013 Sankaran
8,715,608 B2 5/2014 Sankaran et al.
(Continued)

FOREIGN PATENT DOCUMENTS

JP 2016175820 A 10/2016
WO 2009025835 A1 2/2009

OTHER PUBLICATIONS

Kumari et al, "Synergistic plasma-assisted electrochemical reduction of nitrogen to ammonia", Chem. Commun., 2018, 54,13347 (Year: 2018).*

(Continued)

*Primary Examiner* — Xiuyu Tai
(74) *Attorney, Agent, or Firm* — Tarolli, Sundheim, Covell & Tummino, LLP

(57) ABSTRACT

A method of ammonia synthesis is described that includes contacting a nitrogen gas-containing plasma with an aqueous solution, thereby forming ammonia from the nitrogen gas and water. The nitrogen gas-containing plasma is present in an electrochemical cell. The electrochemical cell includes a container including an acidic liquid electrolyte. The electrochemical cell also includes a source of nitrogen gas, a metal electrode at least partially immersed in the electrolyte, a metal tube electrode spaced apart from a surface of the electrolyte by a predetermined spacing. The electrochemical cell is configured to provide a plasma spanning the predetermined space from the metal tube electrode to contact the surface of the electrolyte when power is applied to the metal tube electrode.

10 Claims, 10 Drawing Sheets

(51) Int. Cl.
*C25B 11/02* (2021.01)
*C25B 11/061* (2021.01)
*C25B 11/081* (2021.01)
*C25B 15/02* (2021.01)

(58) Field of Classification Search
CPC ........... C25B 11/075; C25B 1/00; C25B 9/65; C25B 11/051; C25B 11/091; C25B 11/04; C01C 1/0494; C01C 1/04; C01C 1/08; C12N 1/20; C12P 3/00; B01J 19/087; B01J 2219/00761; Y02E 60/36; Y02P 20/52
See application file for complete search history.

(56) References Cited

U.S. PATENT DOCUMENTS

| | | | |
|---|---|---|---|
| 2002/0171367 A1* | 11/2002 | Giapis | H05H 1/48 315/111.21 |
| 2003/0164305 A1 | 9/2003 | Denvir et al. | |
| 2004/0134796 A1* | 7/2004 | Shelp | C02F 1/4672 205/755 |
| 2011/0048960 A1 | 3/2011 | Sankaran et al. | |
| 2015/0274534 A1 | 10/2015 | Sankaran et al. | |
| 2016/0194767 A1 | 7/2016 | Mulder | |
| 2016/0329193 A1* | 11/2016 | Sieber | H01J 37/32449 |
| 2017/0037521 A1 | 2/2017 | Licht et al. | |
| 2017/0144891 A1 | 5/2017 | Haruyama | |

OTHER PUBLICATIONS

Medford, A. J. et al., "Photon-Driven Nitrogen Fixation: Current Progress, Thermodynamic Considerations, and Future Outlook", Acs Catalysis 2017, 7, (4), 2624-2643.
Giddey, S. et al., "Review of electrochemical ammonia production technologies and materials", Int. J. Hydrog. Energy 2013, 38, (34), 14576-14594.
Ver der Ham et al., "Challenges in reduction of dinitrogen by proton and electron transfer", Chem. Soc. Rev. 2014, 43, 5183-5191.
Kuglar, K. et al., "Towards a carbon independent and CO2-free electrochemical membrane process for NH3 synthesis" Phys. Chem. Chem. Phys. 2014, 161 6129-6138.
Mozzanega, H. et al., "Ammonia oxidation over UV-irradiated titanium dioxide at room temperature", J. Phys. Chem. 1979, 83, 2251-2255.
Skulason, E. et al., "A theoretical evaluation of possible transition metal electro-catalysts for N-2 reduction", Phys. Chem. Chem Phys. 2012, 14, 1235-1245.
Montoya, J. H. et al., "The Challenge of Electrochemical Ammonia Synthesis: A New Perspective on the Role of Nitrogen Scaling Relations", ChemSusChem 2015, 8, 2180-2186.
Singh, A. R. et al., "Electrochemical Ammonia Synthesis—The Selectivity Challenge", ACS Catalysis 2017, 7, 706-709.
Eyde, H. S., "The Manufacture of Nitrates from the Ttmosphere by the Electric Arc—Birkeland-Eyde process", J. Royal Soc. Arts 1909, 57, 568-576.
Kim, H - H. et al., "Atmospheric-pressure nonthermal plasma synthesis of ammonia over ruthenium catalysts", Plasma Process Polym. 2017, 14, 1-9.
Kubota, Y. et al., "Synthesis of Ammonia through Direct Chemical Reactions between an Atmospheric Nitrogen Plasma Jet and a Liquid", J Plasma. Fusion Res. 2010, 5, 042.
Haruyama, T, et al., "Non-catalyzed one-step synthesis of ammoniafrom atmospheric air and water", Green Chem. 2016, 18, 4536-4541.
Rumbach, P. et al., "The solvation of electrons by anatmospheric-pressure plasma", Nat. Comm. 2015, 7248.
Zhu, D. et al., "Photo-illuminated diamond as a solid-state source of solvated electrons in water for nitrogen reduction", Nat. Mater. 2013, 8, 836-841.
Richmonds, C. et al., "Plasma-liquid electrochemistry: Rapid synthesis of colloidal metal nanoparticles by microplasma reduction of aqueous cations" Appl. Phys. Lett. 2008, 93, 131501.
Richmonds, C. et al., "Electron-Transfer Reactions at the Plasma-Liquid Interface", J. Am. Chem. Soc. 2011, 133, 17582-17585.
Ghosh, S. et al., "Quantitative Study of Electrochemical Reduction of Ag+to AgNanoparticles in Aqueous Solutions by a Plasma Cathode", J. Electrochem. Soc. 2017, 164, D818-D824.
Buxton, G. V. et al., "Critical Review of Rate Constants for Reactions of Hydrated Electrons,Hydrogen Atoms and Hydroxyl Radicals (.OH/.O-)in Aqueous Solution", J. Phys. Chem. Ref. Data 1988, 17, 513-886.
Christianson, J. R. et al., "Mechanism of N2 Reduction to NH3 by Aqueous Solvated Electrons", J. Phys. Chem. B 2014, 118, 195-203.
Bazhenova, T. A. et al., "Nitrogen fixation in solution", Coord. Chem. Rev. 1995, 144, 69-145.
Kim, K-W. et al., "The electrolytic decomposition mechanism of ammonia to nitrogen at an IrO 2 anode", Electrochimica Acta 2005, 4356-4364.
Madden, K. P. et al., "Critical Review of Aqueous Solution Reaction Rate Constants for Hydrogen Atoms", J. Phys. Chem. Ref. Data 2011, 40, 023103.
Rumbach, P. et al., "The effect of air on solvated electron chemistry at a plasma/liquid interface", J. Phys. D 2015, 48, 424001.
International Search Report and Written Opinion issued in PCT application No. PCT/US2019/027836, dated Jul. 2, 2019.
Extended European Search Report for corresponding European Application Serial No. 199771136.9, dated Mar. 16, 2022, pp. 1-21.

* cited by examiner

AMMONIA SYNTHESIS USING PLASMA-PRODUCED ELECTRONS

RELATED APPLICATION DATA

This application claims the benefit of U.S. Provisional Application Ser. No. 62/647,021, filed Mar. 23, 2018, which is incorporated by reference herein.

GOVERNMENT FUNDING

The present invention was made with government support under grant W911NF-17-0119 awarded by the Department of Defense/Army Research Office. The government has certain rights in this invention.

BACKGROUND OF THE INVENTION

The fixation of nitrogen ($N_2$) has an enormous energy, environmental, and societal impact, the most important of which is the synthesis of ammonia ($NH_3$) for fertilizers that helps support nearly half of the world's population. Industrially, $NH_3$ is currently produced via the Haber-Bosch (H-B) process by reacting $N_2$ with hydrogen ($H_2$) over an iron-based catalyst at high pressure, about 150-300 standard atmosphere (atm) and high temperature, about 400-500 degree Celsius (° C.). See Appl, M., Ammonia, I. Introduction. In Ullmann's Encyclopedia of Industrial Chemistry, Wiley-VCH Verlag GmbH & Co KGaA: 2012. This heterogeneous reaction scheme consumes more energy and contributes more greenhouse gas emissions than any other process associated with the top large-volume chemicals manufactured worldwide. A critical reason is that the source of $H_2$ for H-B process is fossil fuels, and either coal or natural gas must also be catalytically converted in multiple steps before $NH_3$ synthesis takes place. Because of the low single-pass conversion efficiency (15%) and high temperatures and high pressures, plants that implement H-B process are large and centralized to be economical, making them difficult to integrate with renewable sources of $H_2$ such as electrolysis.

Strategies for large-scale $NH_3$ synthesis at ambient conditions that use renewable sources of $H_2$ or water are being explored including photochemical processes (See Medford, A. J. et al., Acs Catalysis 2017, 7, (4), 2624-2643) and electrochemical processes (See Giddey, S. et al., Int. J. Hydrog. Energy 2013, 38, (34), 14576-14594). The major bottleneck with these approaches has been poor selectivity (<1%) for the desired $NH_3$ product, especially at mild temperatures (<80° C.), which, in turn, means higher energy consumption, as well as higher capital cost and equipment footprint. See van der Ham et al., Chem. Soc. Rev. 2014, 43, 5183-5191 and Kuglar, K. et al., Phys. Chem. Chem. Phys. 2014, 16, 6129-6138. Photocatalytic reduction suffers from weak adsorption of $N_2$ on the surface of and oxidation of the reaction products by the holes in semiconductor catalysts. See Mozzanega, H. et al., J. Phys. Chem. 1979, 83, 2251-2255. Electrocatalytic reduction has been characterized by large overpotentials that are required for the relatively stable $N_2$ to associatively or dissociatively adsorb on a metal catalyst and energetically satisfy multiple intermediates involved in the complex reaction mechanism. See Skulason, E. et al., Phys. Chem. Chem. Phys. 2012, 14, 1235-1245, and Montoya, J. H. et al., ChemSusChem 2015, 8, 2180-2186. Moreover, the electrocatalysts with the lowest overpotentials are metals that favor the adsorption of hydrogen species ($H_2$, $H^+$, etc.) over $N_2$, making it difficult to suppress the hydrogen evolution reaction (HER), which ultimately compromises $NH_3$ formation. See Singh, A. R. et al., ACS Catalysis 2017, 7, 706-709.

Plasma-based processes are capable of activating $N_2$ without a catalyst by generating highly energetic electrons. In fact, nitrogen fixation occurs naturally in the atmosphere from lightening and before H-B process was developed. The very first method for nitrogen fixation was an electric arc in air known as the Birkeland-Eyde process. See Eyde, H. S., J. Royal Soc. Arts 1909, 57, 568-576. More recently, plasmas have been combined with solid catalysts to enhance the heterogeneous reaction of $N_2$ and $H_2$ and enable $NH_3$ synthesis at atmospheric pressure and room temperature. See Kim, H-H. et al., Plasma Proc. Poly. 2017, 14, 1-9. The synthesis of $NH_3$ has also been reported from other sources of hydrogen such as ethanol and water. Water in particular is attractive to avoid the dependence on fossil fuels. See Kubota, Y. et al., J. Plasma. Fusikon Res. 2010, 5, 042, and Haruyama, T. et al., Green Chem. 2016, 18, 4536-4541.

SUMMARY OF THE INVENTION

The present invention is directed to a method and a system to synthesize ammonia. Strategies for scalable ammonia synthesis at ambient conditions that use renewable sources of energy and feedstocks are being explored to replace the Haber-Bosch process. Here the inventors present a catalyst-free, electrolytic hybrid plasma system which is capable of high faradaic efficiency (up to 100%) and production rate (up to 0.44 mg ammonia/hour) at atmospheric temperature and pressure using nitrogen gas in the plasma, and water as a proton source. Adding scavenging nitrates to the system demonstrates that the ammonia production process occurs through a mechanism involving hydrogen radial (H.) and solvated electrons and additional experiments. Compared to alternative electricity-driven demonstrations which use water as the proton source at atmospheric temperatures and pressures, the hybrid plasma process emerges as an efficient technique with high production rates and is therefore promising for renewable ammonia generation where there is an abundance of renewable energy.

In some embodiments, the invention includes a catalyst-free, electrolytic approach to form $NH_3$ at ambient (e.g., 25° C.) temperature and pressure from $N_2$ and water by injecting electrons from a plasma into liquid water. Solvated electrons, one of the most powerful reducing agents known, are created in a plasma by electrical breakdown of a gas in contact with a liquid surface such as water. See Rumbach, P. et al., Nat. Comm. 2015, 7248. The feasibility of solvated electrons reducing $N_2$ to $NH_3$ has been previously demonstrated using boron-doped diamond films, but required ultraviolet (UV) radiation to generate the solvated electrons and the selectivity for $NH_3$ was not determined. See Zhu, D. et al., Nat. Mater. 2013, 8, 836-841. By using only electricity to form the solvated electrons, the inventors are able to calculate the current (faradaic) efficiency for $NH_3$ synthesis and show that up to 100% selectivity is possible. The role of solvated electrons and hydrogen radicals (H.) in the reaction mechanism is clarified by scavenger experiments which show that $NH_3$ synthesis is reduced by removing them. The reducing potential of solvated electrons, lack of a solid catalyst surface, and the localized flow of $N_2$ are all suggested as possible reasons for the remarkably high selectivity of this hybrid electrolytic approach.

In one embodiment, a method of ammonia synthesis includes contacting a nitrogen gas-containing plasma with an aqueous solution, thereby forming ammonia from the nitrogen gas and water.

In another embodiment, an electrochemical cell for ammonia synthesis includes a container including an acidic liquid electrolyte. The electrochemical cell also includes a source of nitrogen gas, a metal electrode at least partially immersed in the electrolyte, a metal tube electrode spaced apart from a surface of the electrolyte by a predetermined spacing, and a plasma spanning the predetermined space from the metal tube electrode to contact the surface of the electrolyte.

BRIEF DESCRIPTION OF THE FIGURES

The present invention may be more readily understood by reference to the following figures wherein.

DETAILED DESCRIPTION OF THE INVENTION

Definitions

Figure 1:
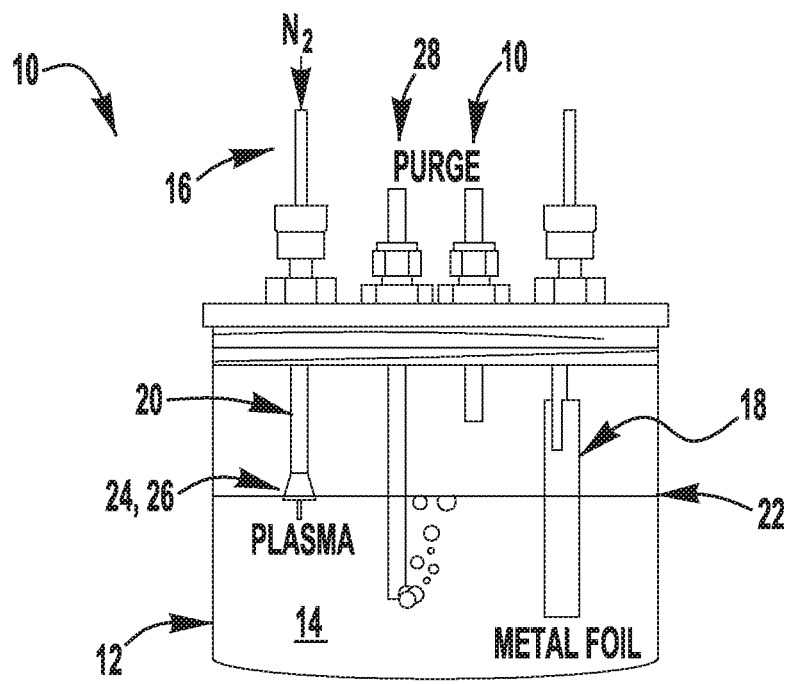
FIG. 1 provides a schematic illustration of a hybrid plasma electrolytic system configured for catalyst-free, electrolytic $NH_3$ production from $N_2$ and water using plasma-produced solvated electrons.

Unless otherwise defined, all technical and scientific terms used herein have the same meaning as commonly understood by one of ordinary skill in the art to which this application pertains. Although methods and materials similar or equivalent to those described herein can be used in the practice or testing of the exemplary embodiments, suitable methods and materials are described below. In case of conflict, the present specification, including definitions, will control. In addition, the materials, methods, and examples are illustrative only and not intended to be limiting.

The terminology as set forth herein is for description of the embodiments only and should not be construed as limiting the application as a whole. Unless otherwise specified, "a," "an," "the," and "at least one" are used interchangeably. Furthermore, as used in the description of the application and the appended claims, the singular forms "a", "an", and "the" are inclusive of their plural forms, unless contraindicated by the context surrounding such.

The recitations of numerical ranges by endpoints include all numbers subsumed within that range (e.g., 1 to 5 includes 1, 1.5, 2, 2.75, 3, 3.80, 4, 5, etc.).

The term "about" as used herein when referring to a measurable value such as an amount, a temporal duration, and the like, is meant to encompass variations of ±20% or 110%, more preferably ±5%, even more preferably ±1%, and still more preferably ±0.1% from the specified value, as such variations are appropriate to perform the disclosed methods.

As used herein, "plasma" is a state of matter in which an ionized gaseous substance becomes highly electrically conductive to the point that long-range electric and magnetic fields dominate the behavior of the matter. Plasma is an electrically neutral medium of unbound positive and negative particles.

As used herein, the term "nitrogen gas in the plasma," "nitrogen gas-containing plasma," or "nitrogen plasma" encompasses plasma created using nitrogen gas. "Nitrogen gas in the plasma" or "nitrogen plasma" contains ionized nitrogen.

Faradaic efficiency is calculated by the equation below.

$$\text{Faradaic efficiency (\%)} = \frac{\text{Experimentally measured NH}_3 \text{ concentration}}{\text{Faradaic NH}_3 \text{ concentration}} \times 100,$$

where $$\text{Faradaic NH}_3 \text{ concentration} = \frac{Q}{FzV},$$

where Q is the total charge, F is Faraday's constant, z is the number of electrons and equal to 3 for the $NH_3$ reaction, and V is the volume of the solution and equal to 20 milliliter (mL).

An Electrochemical Cell and a Method for Synthesizing Ammonia

The present invention is directed to methods for ammonia synthesis at ambient conditions that use renewable sources of energy and feedstocks. These methods can be used, for example, to replace the Haber-Bosch process. In one aspect, the invention provides a catalyst-free, electrolytic hybrid plasma system which is capable of achieving a high faradaic efficiency and an ammonia production rate at atmospheric temperature and pressure using nitrogen gas in the plasma, and water as a proton source. In particular, the faradaic efficiency may be between about 70% and about 100%, between about 80% and about 100%, between about 90% and about 100%, and about 100%. The ammonia production rate may be between about 0.2 milligram per hour (mg/hour) and 0.44 mg/hour, between about 0.3 mg/hour and 0.44 mg/hour, between about 0.4 mg/hour and 0.44 mg/hour, and about 0.44 mg/hour In one aspect, the present invention provides a method of ammonia ($NH_3$) synthesis. The method may include contacting a nitrogen gas ($N_2$) containing plasma with an aqueous solution, thereby forming ammonia from the nitrogen gas and water. An aqueous solution is a solution in which the solvent is water. Preferably, the aqueous solution includes electrolytes that help to conduct current within the aqueous solution. While not intending to be bound by theory, the inventors believe that the presence of solvated electrons and H. in plasma electrolytic synthesis of $NH_3$ play an important role in providing the improved characteristics of the ammonia synthesis method described herein.

In some embodiments, the nitrogen gas-containing plasma (e.g., nitrogen plasma) is a microplasma, which is a plasma of small dimensions. A microplasma can have a diameter ranging from about 10 to 100 micrometers, or from 100 to 1000 micrometers. The nitrogen gas-containing plasma may be present in an electrochemical cell including a plasma-generating cathode and a metal anode. Details of the electrochemical cell are discussed herein (see for example FIG. 1 and Example 1). The nitrogen gas is delivered to the aqueous solution from the plasma-generating cathode while an electrical current is applied to generate the nitrogen gas-containing plasma.

The electrical current used to generate the plasma may range from about 1 milliampere (mA) to about 20 mA, about 1 mA to about 15 mA, or about 1 mA to about 8 mA. The nitrogen gas may be delivered at a flow rate of about 100 milliliter per minute (mL/min) to about 150 mL/min, about 110 mL/min to about 140 mL/min, about 120 mL/min to about 130 mL/min, or about 125 mL/min.

The method may be carried out at a suitable temperature and pressure such that the water in the aqueous solution is in liquid form. Accordingly, in some embodiments, the temperature is greater than 0 degree Celsius (° C.) and lower than 100° C., between about 5 degree Celsius (° C.) and 45° C., between about 10° C. and 40° C., between about 15° C. and 35° C., between about 20° C. and 30° C., between about 22° C. and 28° C., between about 24° C. and 26° C., and about 25° C. In some embodiments, the method may be carried out at room temperature (e.g. 25° C.) and atmospheric pressure. The method can also be carried out at a variety of moderate pressures. The pressure may be between about 1.5 atmospheric pressure (atm) and 0.5 atm, between about 1.3 atm and 0.7 atm, between about 1.2 atm and 0.8 atm, between about 1.1 atm and 0.9 atm, and about 1 atm.

In another aspect, the present invention provides an electrochemical cell for ammonia synthesis. An electrochemical cell is a device capable of using electrical energy to cause a chemical reaction such as the formation of ammonia. The electrochemical cell may include a container including an acidic liquid electrolyte, a source of nitrogen gas, a metal electrode at least partially immersed in the electrolyte, and a metal tube electrode spaced apart from a surface of the electrolyte by a predetermined spacing. When in operation, the electrochemical cell includes a plasma spanning the predetermined space from the metal tube electrode to contact the surface of the electrolyte. The plasma is generated when power is applied to the metal tube electrode. Power can be provided by an electrical power supply device that supplies electric power. The predetermined spacing may be between about 1 millimeter (mm) and about 1 centimeter (cm), between about 1 mm and about 0.5 cm, between about 0.5 mm and 0.5 cm, between about 1 mm and about 0.1 cm, and less than about 1 mm. The electrochemical cell is configured to synthesize ammonia from the nitrogen gas and water (e.g., water in the acidic liquid electrolyte) under moderate (e.g., atmospheric) pressure.

The container is configured to contain the acidic liquid electrolyte. An advantage of the present invention is that the method of ammonia synthesis can be carried out on a relatively small scale. The volume of the container or the electrochemical cell may be any suitable values. For example, the container or the electrochemical cell may have a volume of about 1 liter or less, about 500 millimeters (mL) or less, about 300 mL or less, about 200 mL or less, about 100 mL or less, about 50 mL or less, about 30 mL or less, about 20 mL or less, about 10 mL or less, or 5 mL or less. The acidic liquid electrolyte may be an aqueous solution has a pH of 5 or less, 4 or less, 3.5, or 2. The acidic liquid may include a solution containing sulfuric acid ($H_2SO_4$) in deionized water having a pH of 5, 4, 3.5, or 2. In further embodiments, acids other than sulfuric acid, such as hydrochloric acid or nitric acid, can also be used in the electrolyte solution.

The source of nitrogen gas is configured to supply nitrogen gas to the metal tube electrode (e.g., the plasma generating cathode). The source of nitrogen gas may include a hollow conductive body including a first opening and a second opening comprising a nitrogen gas outlet and the second opening being separated from the surface of the acidic liquid electrolyte by the predetermined spacing. Preferably, the nitrogen gas supplied is relatively pure, but in some embodiments the nitrogen gas can include additional non-reactive gases such as argon. The source of nitrogen may be configured to deliver the nitrogen gas at a flow rate of about 100 milliliter per minute (mL/min) to about 150 mL/min, about 110 mL/min to about 140 mL/min, about 120 mL/min to about 130 mL/min, or about 125 mL/min.

The metal electrode (e.g., anode) may be any suitable anode material and in any suitable shape or dimension. For example, the metal electrode may be made of platinum (Pt), gold, silver, or copper The metal tube electrode may be made of any suitable cathode material and in any suitable shape or dimension capable of deliver the nitrogen gas toward the acidic liquid electrolyte gas. For example, the metal tube electrode may be made of stainless steel.

FIG. 1 shows a schematic depiction of the chemical electrochemical cell for ammonia synthesis set forth above. In the illustrated embodiment, an electrochemical cell 10 may include a container 12 including an acidic liquid electrolyte or an aqueous solution 14. The electrochemical cell 10 may include a source 16 of nitrogen gas, a metal electrode 18 (e.g., anode) at least partially immersed in the electrolyte 14, and a metal tube electrode 20 (e.g., cathode) spaced apart from a surface 22 of the electrolyte 14 by a predetermined spacing 24. The nitrogen gas may be delivered to the electrolyte or aqueous solution 14 from the metal tube electrode 20, which is a plasma-generating cathode. The metal tube electrode 20 may be connected to a power supply and the metal electrode 18 may be wired to a resistor to ground the metal electrode 18. When a negative high voltage is applied via the power supply, a plasma 26 is created spanning the predetermined space 24 from the metal tube electrode 20 to contact the surface 22 of the electrolyte 14. In some embodiments, the electrochemical cell 10 may include a first purging tube 28 and a second purging tube 30 to ensure that the electrochemical cell 10 is isolated from ambient gasses. The first purging tube 28 may be used for bubbling nitrogen through the electrolyte 14 and the second purging tube 30 may be used as an exhaust.

Below synthesis of $NH_3$ from $N_2$ and water using plasma-produced solvated electrons is discussed with reference to the electrochemical cell 10.

The setup bears similarity to electrochemical approaches except that the metal cathode was replaced by a plasma formed in a gas gap between a stainless steel nozzle and the solution surface. Details of reactions at the plasma-liquid interface have been reported elsewhere. See Richmonds, C. et al., Appl. Phys. Lett. 2008, 93, 131501, Richmonds, C. et al., J. Am. Chem. Soc. 2011, 133, 17582-17585, and Ghosh, S. et al., J. Electrochem. Soc. 2017, 164, D818-D824.

Here, in order to study $NH_3$ formation, both argon (Ar) and $N_2$ were investigated as the plasma gas and the purge gas, the latter of which was bubbled through the electrolyte solution. All experiments were performed with a platinum (Pt) electrode immersed in the solution which operated as the anode. The electrolyte may include a solution containing sulfuric acid ($H_2SO_4$) in deionized water (18.2 MΩ) to both supply and conduct protons ($H^+$) for $N_2$ reduction and trap the as-synthesized $NH_3$, as will be discussed.

Figure 2:
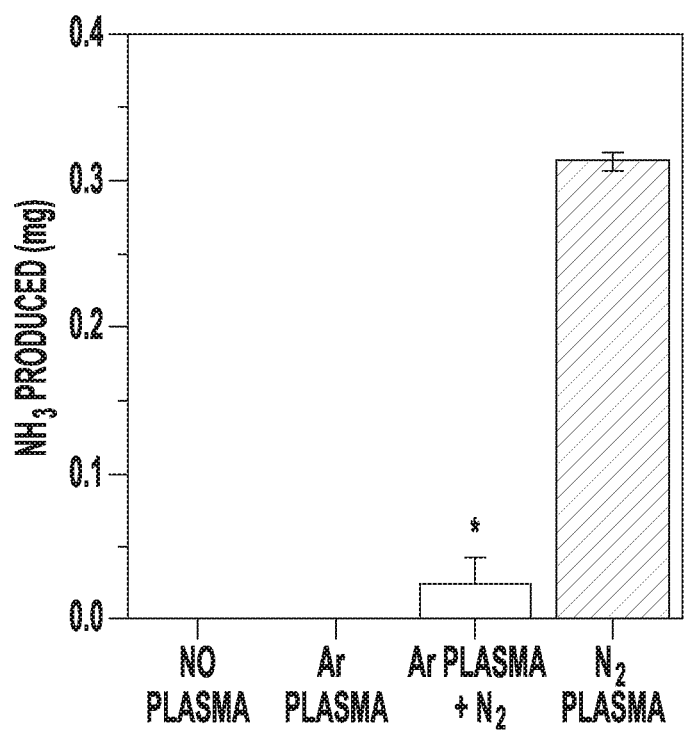
FIG. 2 provides a graph illustrating total $NH_3$ produced after 45 minutes at 6 milliampere (mA) for various gas configurations (no plasma, Ar plasma, Ar plasma and $N_2$, and $N_2$ plasma).

The inventors initially performed a series of control experiments to verify $NH_3$ formation under the same amount of time and current of 45 minutes and 6 milliampere (mA), respectively. FIG. 2 shows the average mass of $NH_3$ produced for the following configurations: 1) $N_2$ gas flowing into the cathode where the plasma is normally generated, and bubbled through the solution, but electrical power applied (i.e. plasma generated), 2) Ar gas in the plasma and bubbled, 3) Ar gas in the plasma and $N_2$ gas bubbled, and 4) $N_2$ gas in the plasma and bubbled. The complete set of data for all trials which produced ammonia is shown in Table 1.

TABLE 1

Summary of $NH_3$ produced and Faradaic efficiencies by plasma electrolytic synthesis for Ar gas in the plasma and $N_2$ gas bubbled in solution and $N_2$ gas in the plasma and $N_2$ gas bubbled in solution. The current was 6 mA, the processing time was 45 minutes, and the reaction volume was 20 milliliter (mL) in both cases.

| | $NH_3$ produced (mM) | $NH_3$ produced (mg) | Total charge (mAs) | Faradaic $NH_3$ conc. (mM) | Faradaic efficiency (%) |
|---|---|---|---|---|---|
| Ar plasma + $N_2$ bubbling | | | | | |
| Trial 1 | 0.022 | 0.007 | 16254 | 2.81 | 0.8 |
| Trial 2 | 0.172 | 0.059 | 16227 | 2.80 | 6.1 |
| Trial 3 | 0.067 | 0.023 | 16198 | 2.80 | 2.4 |
| Trial 4 | 0.003 | 0.001 | 16394 | 2.83 | 0.1 |
| Trial 5 | 0.144 | 0.049 | 16252 | 2.81 | 5.1 |
| Trial 6 | 0.029 | 0.010 | 16228 | 2.80 | 1.0 |
| Average | 0.025 ± 0.018 | | | | 2.58 ± 1.85 |
| $N_2$ plasma + $N_2$ bubbling | | | | | |
| Trial 1 | 0.919 | 0.313 | 16240 | 2.86 | 32.1 |
| Trial 2 | 0.889 | 0.303 | 16314 | 2.87 | 30.9 |
| Trial 3 | 0.902 | 0.307 | 16387 | 2.89 | 31.2 |
| Trial 4 | 0.929 | 0.317 | 16288 | 2.87 | 32.4 |
| Trial 5 | 0.919 | 0.313 | 16322 | 2.88 | 31.9 |
| Trial 6 | 0.926 | 0.315 | 16263 | 2.87 | 32.3 |
| Trial 7 | 0.896 | 0.305 | 16253 | 2.81 | 31.9 |
| Trial 8 | 0.902 | 0.307 | 16227 | 2.80 | 32.2 |
| Trial 9 | 0.908 | 0.309 | 16199 | 2.80 | 32.5 |
| Trial 10 | 0.990 | 0.337 | 16394 | 2.83 | 35.0 |
| Average | 0.313 ± 0.006 | | | | 32.2 ± 0.6 |

Without a plasma, or with only Ar in the system, no detectable amount of $NH_3$ was found. In comparison, substantially zero $NH_3$ was produced when $N_2$ was either bubbled or in the plasma, confirming that it was not coming from other sources including background contamination. The $NH_3$ yield was significantly larger with $N_2$ in the plasma compared to Ar in the plasma. See Table 2 below.

TABLE 2

Summary of one-sample and two-sample t-tests carried out on data sets in Table 2.

| One-Sample t, Test of $\mu = 0.00$ vs $\mu = t\ 0.00$ | | | | |
|---|---|---|---|---|
| | Algebraic Mean | Standard Deviation | 95% Lower Bound | Probability |
| $N_2$ plasma | 0.313 | 0.010 | 0.306 | 0.000 |
| Ar plasma + $N_2$ | 0.025 | 0.024 | 0.000 | 0.050 |

| Two-Sample t, Test of $\mu_1 - \mu_2 = 0$ | | | | |
|---|---|---|---|---|
| | Difference | 95% Lower Bound | 95% Upper Bound | Probability |
| $N_2$ plasma vs. Ar plasma + N2 | 0.288 | 0.263 | 0.313 | 0.000 |

Figure 3:
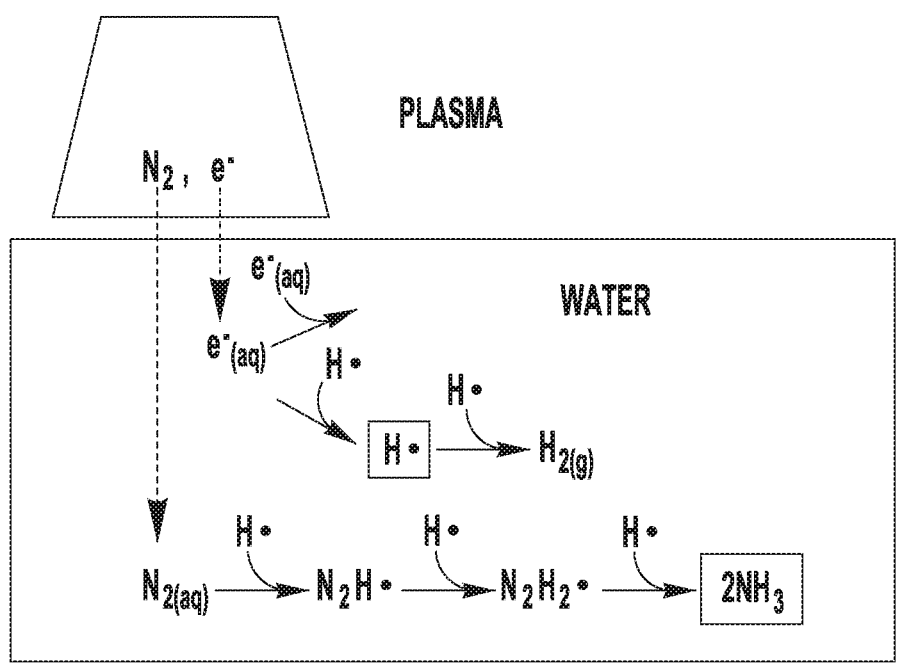
FIG. 3 provides a schematic illustration of key reaction pathways involving solvated electrons ($e^-_{aq}$) and hydrogen radials (H.) that lead to $NH_3$ formation.

A potential mechanism for $NH_3$ synthesis is illustrated in FIG. 3, highlighting the key reactions that could be initiated by solvated electrons. As noted, solvated electrons in liquid water are highly reactive with a reduction potential of −2.86

V and could be involved in a multitude of reactions. See Buxton, G. V. et al., J. Phys. Chem. Ref. Data 1988, 17, 513-886. Previous work on solvated electron-mediated formation of $NH_3$ has shown that a likely pathway is through the formation of hydrogen radicals (H.), for example $H^+ + e^-_{(aq)} \rightarrow H.$, followed by reaction of H. with $N_2$ to form $N_2H$. See Christianson, J. R. et al., J. Phys. Chem. B 2014, 118, 195-203. This is generally consistent with the identification of $N_2H$ as the critical intermediate in reduction of $N_2$ by proton and electron transfer. See Bazhenova, T. A. et al., Coord. Chem. Rev. 1995, 144, 69-145. The intermediate, $N_2H$, then continues to react with H. to ultimately produce $NH_3$. Analogous to electrochemical synthesis of $NH_3$, the HER is a major competing reaction, reducing selectivity, and occurs via either the second order recombination of solvated electrons, $2e^-_{(aq)} + 2H_2O \rightarrow H_{2(g)} + 2OH^-$, or hydrogen radicals, $2H. \rightarrow H_{2(g)}$. Without these side reactions occurring, $NH_3$ production only requires three electrons. The inventors note that while other reaction pathways to produce $H_2$ involving solvated electrons and/or hydrogen radicals exist, these two are the most kinetically important.

Figure 4:
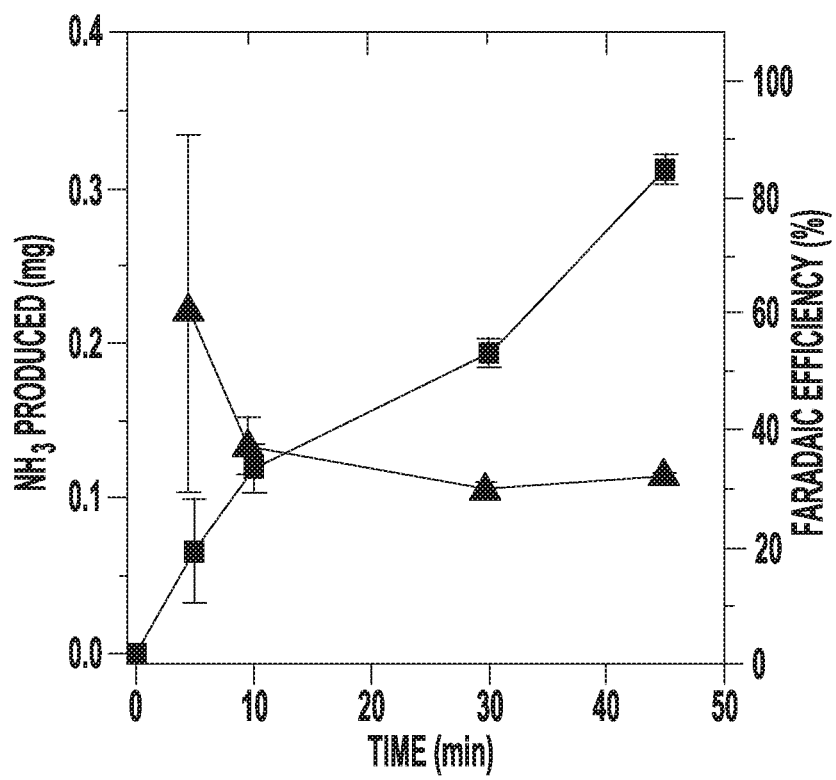
FIG. 4 provides a graph illustrating $NH_3$ yield and efficiency in a plasma electrolytic system, where total $NH_3$ produced and corresponding faradaic efficiency are shown as a function of process time at 6 mA.

$NH_3$ yield and efficiency in the plasma electrolytic system were examined by measuring the amount of $NH_3$ synthesized for different periods of time and at different steady-state operating currents. FIG. 4 shows the average mass of $NH_3$ obtained as a function of time at a current of 6 mA. The complete set of data for all trials is shown in Table 3. A linear increase in $NH_3$ produced with time would indicate a constant production rate, but the inventors find that the rate changes, decreasing after 10 minutes. The efficiency was estimated by comparing the measured $NH_3$ mass at each time point to the amount of $NH_3$ calculated from Faraday's law assuming a three electron reaction.

TABLE 3

Summary of $NH_3$ produced and Faradaic efficiencies by plasma electrolytic synthesis after different processing times. The current was 6 mA and the reaction volume was 20 mL in all cases.

| | $NH_3$ produced (mM) | $NH_3$ produced (mg) | Total charge (mAs) | Faradaic $NH_3$ conc. (mM) | Faradaic efficiency (%) |
|---|---|---|---|---|---|
| | | | t = 5 min | | |
| Trial 1 | 0.206 | 0.070 | 1838 | 0.317 | 64.9 |
| Trial 2 | 0.073 | 0.025 | 1862 | 0.322 | 22.8 |
| Trial 3 | 0.339 | 0.116 | 1832 | 0.317 | 107.1 |
| Trial 4 | 0.150 | 0.051 | 1866 | 0.322 | 46.5 |
| Average | | 0.065 ± 0.033 | | | 60.3 ± 30.9 |
| | | | t = 15 min | | |
| Trial 1 | 0.335 | 0.114 | 5508 | 0.951 | 35.2 |
| Trial 2 | 0.285 | 0.097 | 5532 | 0.956 | 29.8 |
| Trial 3 | 0.324 | 0.110 | 5493 | 0.949 | 34.2 |
| Trial 4 | 0.346 | 0.118 | 5519 | 0.935 | 37.1 |
| Trial 5 | 0.461 | 0.157 | 5511 | 0.933 | 49.4 |
| Trial 6 | 0.359 | 0.122 | 5541 | 0.938 | 38.2 |
| Average | | 0.120 ± 0.015 | | | 37.3 ± 4.9 |
| | | | t = 30 min | | |
| Trial 1 | 0.574 | 0.196 | 11026 | 1.905 | 30.2 |
| Trial 2 | 0.602 | 0.205 | 11038 | 1.907 | 31.6 |
| Trial 3 | 0.529 | 0.180 | 11014 | 1.902 | 27.8 |
| Trial 4 | 0.572 | 0.195 | 11030 | 1.905 | 30.0 |
| Average | | 0.194 ± 0.009 | | | 29.9 ± 1.3 |
| | | | t = 45 min | | |
| Trial 1 | 0.919 | 0.313 | 16567 | 2.86 | 32.1 |
| Trial 2 | 0.889 | 0.303 | 16643 | 2.87 | 30.9 |
| Trial 3 | 0.902 | 0.307 | 16717 | 2.89 | 31.2 |
| Trial 4 | 0.929 | 0.317 | 16615 | 2.87 | 32.4 |
| Trial 5 | 0.919 | 0.313 | 16651 | 2.88 | 31.9 |
| Trial 6 | 0.926 | 0.315 | 16590 | 2.87 | 32.3 |
| Trial 7 | 0.896 | 0.305 | 16253 | 2.81 | 31.9 |
| Trial 8 | 0.902 | 0.307 | 16227 | 2.80 | 32.2 |
| Trial 9 | 0.908 | 0.309 | 16199 | 2.80 | 32.5 |
| Trial 10 | 0.990 | 0.337 | 16394 | 2.83 | 35.0 |
| Average | | 0.313 ± 0.006 | | | 32.2 ± 0.6 |

The inventors note that while the set point for the current through the hybrid electrolytic system was kept constant, there were small fluctuations over the duration of the experiments arising from plasma instabilities, particularly when the plasma was ignited. See FIGS. 5-8. Although over the experimental period, these fluctuations did not contribute significant deviations from the average current because they occurred on very short time scales on the order of seconds, to ensure that the faradaic amount of $NH_3$ calculated was precise, the temporal current was monitored, I(t), and integrated to obtain the total charge, $Q = \int I(t)dt$. As a function of time, the average faradaic efficiency is found to decrease from ~60% at 5 minutes to a statistically indistinguishable value of ~30% at 30 and 45 minutes as shown in Table 4, consistent with the observed changes in the $NH_3$ production rate.

TABLE 4

Summary of one-sample and two-sample t-tests carried out on data sets in Table 3.

| One-Sample t on $NH_3$ production Test of $\mu = 0.00$ vs $\mu = t$ 0.00 | | | | |
|---|---|---|---|---|
| | Algebraic Mean | St. Deviation | 95% Lower Bound | Probability |
| 5 min | 0.065 | 0.038 | 0.005 | 0.021 |
| 15 min | 0.120 | 0.020 | 0.099 | 0.000 |
| 30 min | 0.194 | 0.010 | 0.178 | 0.000 |
| 45 min | 0.312 | 0.016 | 0.305 | 0.000 |
| Two-Sample t on $NH_3$ production Test of $\mu_1 - \mu_2 = 0$ | | | | |
| | Difference | 95% Lower Bound | 95% Upper Bound | Probability |
| 5 vs. 15 min | 0.054 | −0.003 | 0.112 | 0.059 |
| 15 vs. 30 min | 0.074 | 0.051 | 0.097 | 0.000 |
| 30 vs. 45 min | 0.118 | 0.102 | 0.133 | 0.000 |
| One-Sample t on FE Test of $\mu = 0.00$ vs $\mu > 0.00$ | | | | |
| | Algebraic Mean | St. Deviation | 95% Lower Bound | Probability |
| 5 min | 60.3 | 35.6 | 18.4 | 0.021 |
| 15 min | 37.3 | 6.59 | 31.9 | 0.000 |
| 30 min | 29.9 | 1.56 | 28.1 | 0.000 |
| 45 min | 32.1 | 1.70 | 31.5 | 0.000 |

TABLE 4-continued

Summary of one-sample and two-sample t-tests
carried out on data sets in Table 3.

Two-Sample t on FE
Test of $\mu_1 - \mu_2 = 0$

|  | Difference | 95% Lower Bound | 95% Upper Bound | Probability |
|---|---|---|---|---|
| 5 vs. 15 min | 23.0 | −80.4 | 34.3 | 0.291 |
| 15 vs. 30 min | 7.42 | 0.23 | 14.6 | 0.045 |
| 30 vs. 45 min | 2.24 | −0.175 | 4.66 | 0.062 |

Figure 9:
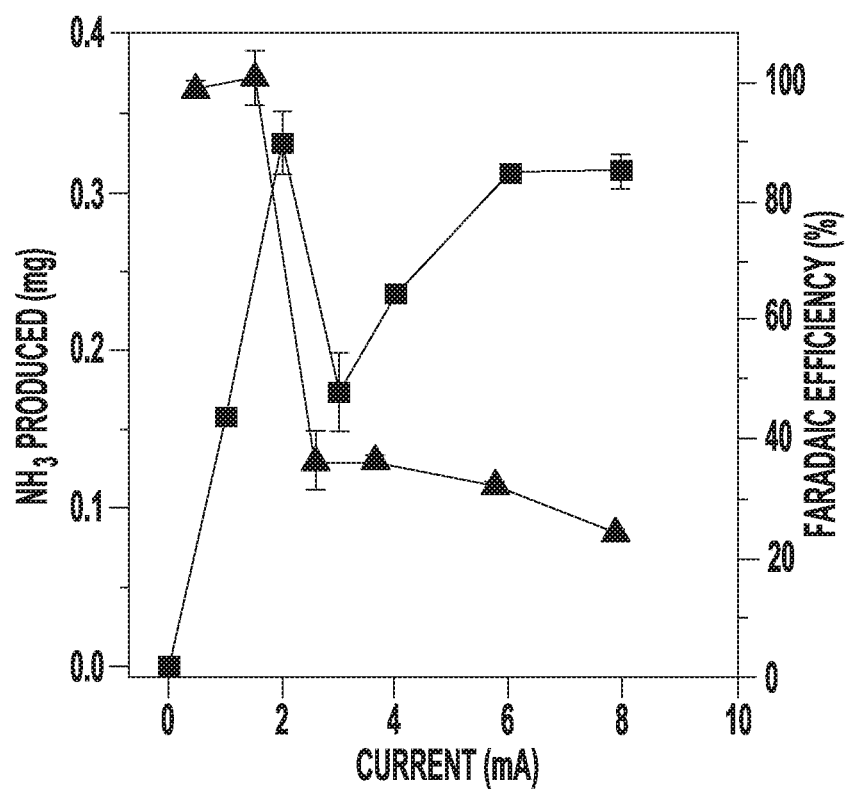
FIG. 9 provides a graph illustrating $NH_3$ yield and efficiency in plasma electrolytic system, where the total $NH_3$ produced and corresponding faradaic efficiency are shown as a function of current after 45 minutes.

FIG. 9 shows the average mass of $NH_3$ produced after 45 minutes as a function of current in the plasma electrolytic system. The complete set of data for all trials is shown in Table 5.

TABLE 5

Summary of $NH_3$ produced and Faradaic efficiencies
by plasma electrolytic synthesis at different currents.
The processing time was 45 minutes and the reaction
volume was 20 mL in all cases.

|  | $NH_3$ produced (mM) | $NH_3$ produced (mg) | Total charge (mAs) | Faradaic $NH_3$ conc. (mM) | Faradaic efficiency (%) |
|---|---|---|---|---|---|
| I = 1 mA |  |  |  |  |  |
| Trial 1 | 0.456 | 0.155 | 2709 | 0.468 | 97.4 |
| Trial 2 | 0.470 | 0.160 | 2705 | 0.467 | 100.7 |
| Trial 3 | 0.465 | 0.158 | 2700 | 0.466 | 99.8 |
| Trial 4 | 0.463 | 0.158 | 2732 | 0.472 | 98.1 |
| Average |  | 0.158 ± 0.002 |  |  | 99.0 ± 1.3 |
| I = 2 mA |  |  |  |  |  |
| Trial 1 | 0.849 | 0.289 | 5438 | 0.939 | 90.4 |
| Trial 2 | 0.939 | 0.320 | 5483 | 0.947 | 99.1 |
| Trial 3 | 0.944 | 0.322 | 5448 | 0.941 | 100.3 |
| Trial 4 | 1.017 | 0.346 | 5798 | 1.002 | 101.5 |
| Trial 5 | 1.050 | 0.358 | 5690 | 0.983 | 106.8 |
| Trial 6 | 1.043 | 0.355 | 5643 | 0.975 | 107.0 |
| Average |  | 0.332 ± 0.020 |  |  | 100.9 ± 4.6 |
| I = 3 mA |  |  |  |  |  |
| Trial 1 | 0.586 | 0.199 | 8132 | 1.405 | 41.7 |
| Trial 2 | 0.514 | 0.175 | 8189 | 1.415 | 36.3 |
| Trial 3 | 0.431 | 0.147 | 8072 | 1.394 | 30.9 |
| Average |  | 0.174 ± 0.025 |  |  | 36.3 ± 5.1 |
| I = 4 mA |  |  |  |  |  |
| Trial 1 | 0.674 | 0.230 | 11121 | 1.921 | 35.1 |
| Trial 2 | 0.714 | 0.243 | 11156 | 1.927 | 37.1 |
| Trial 3 | 0.664 | 0.226 | 11015 | 1.903 | 34.9 |
| Trial 4 | 0.724 | 0.247 | 11049 | 1.909 | 37.9 |
| Trial 5 | 0.664 | 0.226 | 11076 | 1.913 | 34.7 |
| Trial 6 | 0.719 | 0.245 | 11076 | 1.902 | 37.8 |
| Average |  | 0.236 ± 0.007 |  |  | 36.3 ± 1.1 |
| I = 6 mA |  |  |  |  |  |
| Trial 1 | 0.919 | 0.313 | 16567 | 2.86 | 32.1 |
| Trial 2 | 0.889 | 0.303 | 16642 | 2.87 | 30.9 |
| Trial 3 | 0.902 | 0.307 | 16717 | 2.89 | 31.2 |
| Trial 4 | 0.929 | 0.317 | 16615 | 2.87 | 32.4 |
| Trial 5 | 0.919 | 0.313 | 16650 | 2.88 | 31.9 |
| Trial 6 | 0.926 | 0.315 | 16591 | 2.87 | 32.3 |
| Trial 7 | 0.896 | 0.305 | 16253 | 2.81 | 31.9 |
| Trial 8 | 0.902 | 0.307 | 16227 | 2.80 | 32.2 |
| Trial 9 | 0.908 | 0.309 | 16199 | 2.80 | 32.5 |
| Trial 10 | 0.990 | 0.337 | 16394 | 2.83 | 35.0 |
| Average |  | 0.313 ± 0.006 |  |  | 32.2 ± 0.6 |
| I = 8 mA |  |  |  |  |  |
| Trial 1 | 0.962 | 0.328 | 22063 | 3.81 | 25.2 |
| Trial 2 | 0.900 | 0.307 | 22152 | 3.83 | 23.5 |
| Trial 3 | 0.953 | 0.325 | 22111 | 3.82 | 25.0 |
| Trial 4 | 0.877 | 0.299 | 22028 | 3.81 | 23.0 |
| Trial 5 | 0.961 | 0.327 | 22037 | 3.81 | 25.2 |
| Trial 6 | 0.882 | 0.300 | 22047 | 3.81 | 23.2 |
| Average |  | 0.314 ± 0.010 |  |  | 24.2 ± 0.8 |

The current that drives the plasma electrolytic system is measured at the power supply and is the same as the plasma current which, like the Pt anode, is electrically connected in series. Increasing the plasma current leads to an increase in the number of gas-phase electrons injected from the plasma into solution that then solvate, and based on the mechanism shown in FIG. 3, should, thus, increase $NH_3$ production. Here, however, the inventors find that the $NH_3$ yield exhibits a rather complicated dependence on current, significantly increasing from 1 mA to 2 mA, then decreasing significantly from 2 mA to 3 mA, then increasing again from 3 mA to 4 mA and 5 mA to 6 mA before staying constant at 6 mA and 8 mA (See Table 6). These results suggest that as the current is increased to greater than 2 mA, the injected electrons are involved in competing reactions that do not form $NH_3$. This apparent decrease in selectivity towards $NH_3$ is corroborated by the faradaic efficiency which decreases significantly from 2 mA to 3 mA, and then decreases more slowly, but statistically significantly from 4 mA to 8 mA (See Table 6). The most likely reaction pathway that competes with $NH_3$ formation is the HER which occurs either by recombination of solvated electrons or H· (See FIG. 3). In general, the HER is kinetically favored at higher concentrations of solvated electrons or H· because of the second order dependence. Assuming that the solution volume over which the solvated electrons or H· are generated is constant, increasing the current would increase their concentrations and support the observed trends in faradaic efficiency.

TABLE 6

Summary of one-sample and two-sample t-tests
carried out on data sets in Table 5.

One-Sample t on $NH_3$ production
Test of $\mu = 0.00$ vs $\mu > 0.00$

|  | Algebraic Mean | St. Deviation | 95% Lower Bound | Probability |
|---|---|---|---|---|
| 1 mA | 0.158 | 0.002 | 0.155 | 0.000 |
| 2 mA | 0.332 | 0.027 | 0.310 | 0.000 |
| 3 mA | 0.174 | 0.026 | 0.130 | 0.004 |
| 4 mA | 0.236 | 0.010 | 0.228 | 0.000 |
| 6 mA | 0.313 | 0.010 | 0.307 | 0.000 |
| 8 mA | 0.314 | 0.014 | 0.303 | 0.000 |

Two-Sample t on $NH_3$ production
Test of $\mu_1 - \mu_2 = 0$

|  | Difference | 95% Lower Bound | 95% Upper Bound | Probability |
|---|---|---|---|---|
| 1 vs. 2 mA | 0.174 | 0.146 | 0.202 | 0.000 |
| 2 vs. 3 mA | 0.158 | 0.106 | 0.210 | 0.001 |

TABLE 6-continued

Summary of one-sample and two-sample t-tests
carried out on data sets in Table 5.

| | | | | |
|---|---|---|---|---|
| 3 vs. 4 mA | 0.062 | −0.005 | 0.130 | 0.058 |
| 4 vs. 6 mA | 0.077 | 0.065 | 0.088 | 0.000 |
| 6 vs. 8 mA | 0.002 | −0.013 | 0.016 | 0.819 |

One-Sample t on $NH_3$ production FE
Test of $\mu = 100$ vs $\mu < 100$

| | Algebraic Mean | St. Deviation | 95% Upper Bound | Probability |
|---|---|---|---|---|
| 1 mA | 99.0 | 1.51 | 100.7 | 0.000 |
| 2 mA | 1.01 | 6.12 | 105.9 | 0.000 |
| 3 mA | 36.3 | 5.39 | 45.4 | 0.000 |
| 4 mA | 36.2 | 1.52 | 37.5 | 0.000 |
| 6 mA | 32.2 | 1.08 | 32.9 | 0.000 |
| 8 mA | 24.2 | 1.06 | 25.1 | 0.000 |

One-Sample t on FE
Test of $\mu = 0$ vs $\mu > 0.00$

| | Algebraic Mean | St. Deviation | 95% Lower Bound | Probability |
|---|---|---|---|---|
| 1 mA | 99.0 | 1.51 | 97.2 | 0.000 |
| 2 mA | 1.01 | 6.12 | 95.8 | 0.000 |
| 3 mA | 36.3 | 5.39 | 27.2 | 0.004 |
| 4 mA | 36.2 | 1.52 | 35.0 | 0.000 |
| 6 mA | 32.2 | 1.08 | 31.6 | 0.000 |
| 8 mA | 24.2 | 1.06 | 23.3 | 0.000 |

Two-Sample t on FE
Test of $\mu_1 - \mu_2 = 0$

| | Difference | 95% Lower Bound | 95% Upper Bound | Probability |
|---|---|---|---|---|
| 1 vs. 2 mA | 1.88 | −8.59 | 4.84 | 0.505 |
| 2 vs. 3 mA | 64.6 | 53.5 | 75.6 | 0.000 |
| 3 vs. 4 mA | 0.00 | −13.6 | 13.7 | 0.986 |
| 4 vs. 6 mA | 4.00 | 2.38 | 5.63 | 0.000 |
| 6 vs. 8 mA | 8.05 | 6.82 | 9.28 | 0.000 |

Figure 10:
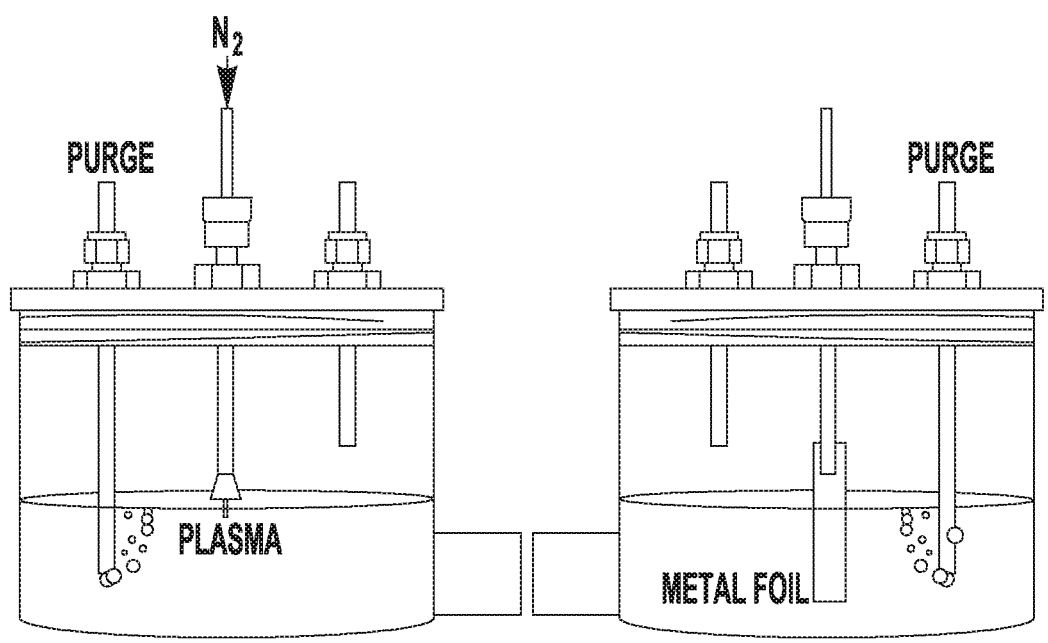
FIG. 10 provides a schematic illustration of a hybrid plasma electrolytic system in a split H-cell geometry.

While abundant $NH_3$ was produced in a single-compartment cell setup, the inventors addressed the potential decomposition of $NH_3$ by comparing with a split H-cell geometry where the plasma cathode was formed in one compartment, the Pt anode was contained in the other, and the solutions in the two compartments were separated by a glass frit that allowed ionic contact, but prevented mixing (See FIG. 10). If $NH_3$ is decomposed by oxidation at the anode in the single cell, the measured amount of $NH_3$ would be lower than what is actually produced at the cathode and the split cell would show a higher yield.

Figure 11:
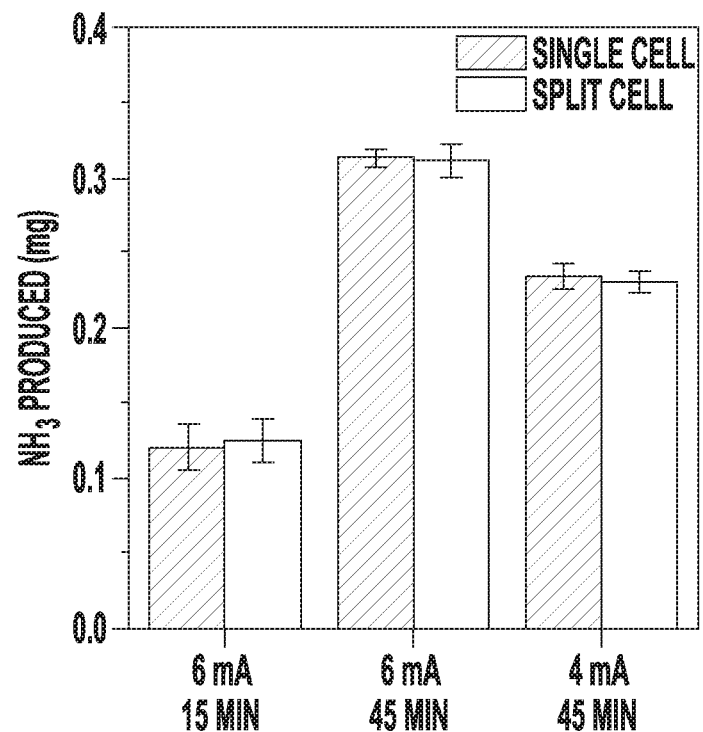
FIG. 11 provides a graph illustrating stability and trapping of $NH_3$ in a plasma electrolytic system, where the total $NH_3$ produced in a split-compartment cell and in single-compartment cell at representative times and current are compared.

FIG. 11 shows the average masses of $NH_3$ produced in a single and split cell at several representative currents and times. The complete set of data for all trials is shown in Table 7. The $NH_3$ yields were found to be statistically identical, indicating that $NH_3$ is not decomposed at the anode (See Table 8). This is consistent with a previously reported proposed mechanism for $NH_3$ decomposition that occurs through reaction with $OH^-$ and only becomes significant in basic solutions. See Kim, K.-W. et al., Electrochimica Acta 2005, 50, 4356-4364.

TABLE 7

Summary of $NH_3$ produced and Faradaic efficiencies
by plasma electrolytic synthesis in a split cell.
The reaction volume was 20 mL in all cases.

| | $NH_3$ produced (mM) | $NH_3$ produced (mg) | Total charge (mAs) | Faradaic $NH_3$ conc. (mM) | Faradaic efficiency (%) |
|---|---|---|---|---|---|
| 6 mA, 45 min | | | | | |
| Trial 1 | 0.874 | 0.298 | 16265 | 2.81 | 31.1 |
| Trial 2 | 0.935 | 0.318 | 16171 | 2.79 | 33.5 |
| Trial 3 | 0.930 | 0.317 | 16180 | 2.79 | 33.3 |
| Average | | 0.311 ± 0.011 | | | 32.6 ± 1.2 |
| 4 mA, 45 min | | | | | |
| Trial 1 | 0.691 | 0.235 | 10791 | 1.86 | 37.1 |
| Trial 2 | 0.651 | 0.222 | 10834 | 1.87 | 34.8 |
| Trial 3 | 0.686 | 0.234 | 10885 | 1.88 | 36.5 |
| Average | | 0.230 ± 0.007 | | | 36.1 ± 1.1 |
| 6 mA, 15 min | | | | | |
| Trial 1 | 0.391 | 0.133 | 5417 | 0.936 | 41.8 |
| Trial 2 | 0.287 | 0.098 | 5402 | 0.933 | 30.8 |
| Trial 3 | 0.447 | 0.152 | 5489 | 0.948 | 47.2 |
| Trial 4 | 0.382 | 0.130 | 5391 | 0.931 | 41.0 |
| Trial 5 | 0.322 | 0.110 | 5393 | 0.932 | 34.5 |
| Trial 6 | 0.362 | 0.123 | 5402 | 0.933 | 38.8 |
| Average | | 0.124 ± 0.014 | | | 39.0 ± 4.3 |

TABLE 8

Summary of two-sample t-tests carried out on
data sets in Table 7 (and Table 5 and Table 3).
Two-Sample t on $NH_3$ production
Test of $\mu_1 - \mu_2 = 0$

| | Difference | 95% Lower Bound | 95% Upper Bound | Probability |
|---|---|---|---|---|
| 6-45 single vs. split | 0.002 | −0.030 | 0.033 | 0.837 |
| 4-45 single vs. split | 0.004 | −0.012 | 0.020 | 0.535 |
| 6-15 single vs. split | 0.005 | −0.021 | 0.030 | 0.692 |

Figure 12:
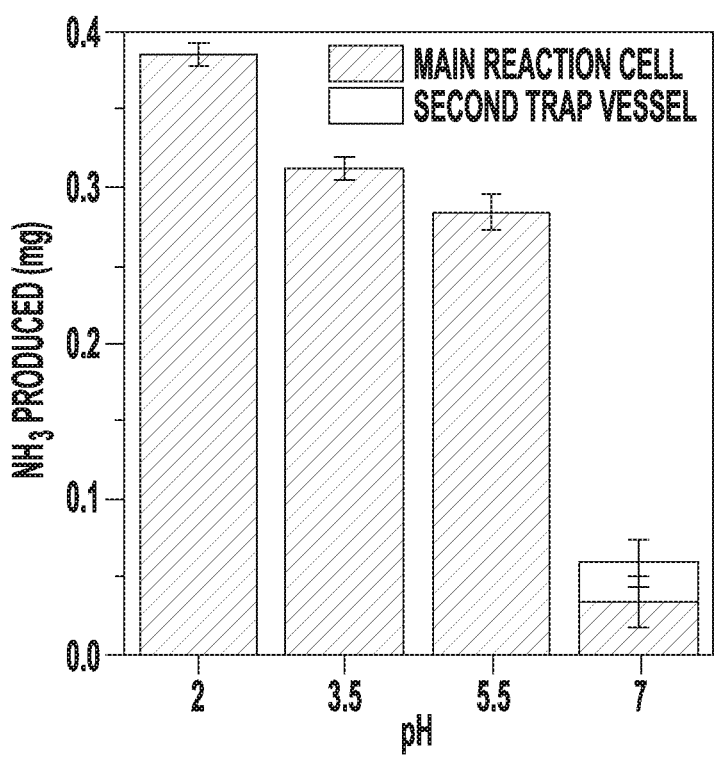
FIG. 12 provides a graph illustrating stability and trapping of $NH_3$ in a plasma electrolytic system, where total $NH_3$ captured in a main reaction cell and a secondary trap vessel (e.g., a strongly acidic $H_2SO_4$ bath; pH=2) as a function of pH in the main reaction cell are compared.

Another possible loss mechanism for $NH_3$ is simply vaporization because of its relatively low solubility. The inventors studied the effectiveness of $NH_3$ trapping by varying the pH of our solution in the single cell and connecting the gas effluent from the cell to a second vessel containing a strongly acidic $H_2SO_4$ bath (pH=2) to ensure complete capture. FIG. 12 shows the average mass of $NH_3$ measured in the main reaction cell and the second trap vessel at different pH. The complete set of data for all trials is shown in Table 9.

TABLE 9

Summary of NH$_3$ produced and Faradaic efficiencies by plasma electrolytic synthesis at different pH. The pH was controlled by the concentration of sulfuric acid. "MC" refers to the main reaction cell and "Trap" refers to a second trapping vessel where the gas exhaust from the main reaction cell was bubbled through a solution of sulfuric acid at pH = 2. The reaction volume was 20 mL in all cases.

| | NH$_3$ produced (mM) | NH$_3$ produced (mg) | Total charge (mAs) | Faradaic NH$_3$ conc. (mM) | Faradaic efficiency (%) |
|---|---|---|---|---|---|
| pH = 2 | | | | | |
| Trial 1 | 1.116 | 0.380 | 16252 | 2.81 | 39.8 |
| Trial 2 | 1.146 | 0.390 | 16227 | 2.80 | 40.9 |
| Trial 3 | 1.104 | 0.376 | 16199 | 2.78 | 39.5 |
| Trial 4 | 1.154 | 0.393 | 16395 | 2.83 | 40.8 |
| Average | | 0.385 ± 0.007 | | | 40.2 ± 0.6 |
| pH = 5.5 | | | | | |
| Trial 1 | 0.884 | 0.301 | 16252 | 2.81 | 31.5 |
| Trial 2 | 0.821 | 0.280 | 16227 | 2.80 | 29.3 |
| Trial 3 | 0.834 | 0.284 | 16198 | 2.80 | 29.8 |
| Trial 4 | 0.796 | 0.271 | 16395 | 2.83 | 28.1 |
| Average | | 0.284 ± 0.011 | | | 29.7 ± 1.2 |
| pH = 7 | | | | | |
| Trial 1 (MC) | 0.134 | 0.045 | 16290 | 2.81 | 4.7 |
| Trial 1 (Trap) | 0.041 | 0.014 | 16290 | 2.81 | 1.5 |
| Trial 2 (MC) | 0.066 | 0.022 | 16231 | 2.80 | 2.3 |
| Trial 2 (Trap) | 0.105 | 0.036 | 16231 | 2.80 | 3.7 |

The results confirm that for pH<7, no detectable amount of NH$_3$ is lost from the reaction cell. The lack of any NH$_3$ collected in the trap at acidic conditions also shows that the NH$_3$ measured in our electrolytic process is not formed in the gas phase, for example by reaction in the plasma between N$_2$ and H$_2$ produced from the HER, but is formed in solution. Interestingly, the inventors also observe that the NH$_3$ yield and faradaic efficiency significantly increase with decreasing pH (See Table 10).

TABLE 10

Summary of one-sample and two-sample t-tests carried out on data sets in Table 9. "MC" refers to the main reaction cell and "Trap" refers to a second trapping vessel where the gas exhaust from the main reaction cell was bubbled through a solution of sulfuric acid at pH = 2.

One-Sample t on NH$_3$ production
Test of µ = 0 vs µ > 0.00

| | Algebraic Mean | St. Deviation | 95% Lower Bound | Probability |
|---|---|---|---|---|
| pH 2.0 (MC) | 0.385 | 0.008 | 0.375 | 0.000 |
| pH 3.5 (MC) | 0.313 | 0.010 | 0.307 | 0.000 |
| pH 5.5 (MC) | 0.284 | 0.013 | 0.269 | 0.000 |
| pH 7 (MC) | 0.034 | 0.016 | −0.039 | 0.104 |
| pH 7 (Trap) | 0.025 | 0.015 | −0.043 | 0.131 |

Two-Sample t on NH$_3$ production
Test of µ$_1$ − µ$_2$ = 0

| | Difference | 95% Lower Bound | 95% Upper Bound | Probability |
|---|---|---|---|---|
| 2.0 (MC) vs. 3.5 (MC) | 0.072 | 0.060 | 0.085 | 0.000 |
| 3.5 (MC) vs 5.5 (MC) | 0.029 | 0.048 | 0.009 | 0.015 |
| 5.5 (MC) vs 7.0 (MC) | 0.250 | 0.083 | 0.417 | 0.033 |
| 7.0 (MC) vs 7.0 (Trap) | 0.009 | −0.210 | 0.192 | 0.668 |

One-Sample t on FE
Test of µ = 0 vs µ > 0.00

| | Algebraic Mean | St. Deviation | 95% Lower Bound | Probability |
|---|---|---|---|---|
| pH 2.0 (MC) | 40.22 | 0.708 | 39.39 | 0.000 |
| pH 3.5 (MC) | 32.24 | 1.080 | 31.62 | 0.000 |
| pH 5.5 (MC) | 29.67 | 1.404 | 28.02 | 0.000 |
| pH 7 (MC) | 3.55 | 1.700 | −4.030 | 0.104 |
| pH 7 (Trap) | 2.60 | 1.610 | −4.560 | 0.131 |

Two-Sample t on FE
Test of µ$_1$ − µ$_2$ = 0

| | Difference | 95% Lower Bound | 95% Upper Bound | Probability |
|---|---|---|---|---|
| 2.0 (MC) vs 3.5 (MC) | 7.978 | 6.844 | 9.113 | 0.000 |
| 3.5 (MC) vs 5.5 (MC) | 2.569 | 0.402 | 4.736 | 0.030 |
| 5.5 (MC) vs 7.0 (MC) | 26.13 | 8.470 | 43.79 | 0.034 |
| 7.0 (MC) vs 7.0 (Trap) | 0.950 | −20.04 | 21.93 | 0.669 |

This is consistent with the potentially important roles of H. and the competing HER pathways (see FIG. 3). Decreasing pH leads to an increase in the proton (H$^+$) concentration and enhances the rate of H$^+$ reacting with solvated electrons via mass action to produce H. relative to the second order recombination of solvated electrons (see FIG. 3), ultimately increasing the NH$_3$ production rate and selectivity. The inventors do not find a decrease in the NH$_3$ yield and faradaic efficiency even at the lowest pH tested of pH=2, which indicates that the second order recombination of H. does not become important; this suggests that N$_2$ may be sufficiently abundant in our process and reacts quickly with any available H. to form NH$_3$. The inventors note that the dependence of NH$_3$ formation on H$^+$ is independent of its trapping since all the NH$_3$ formed is effectively captured in the reaction cell below pH=7.

Figure 13:
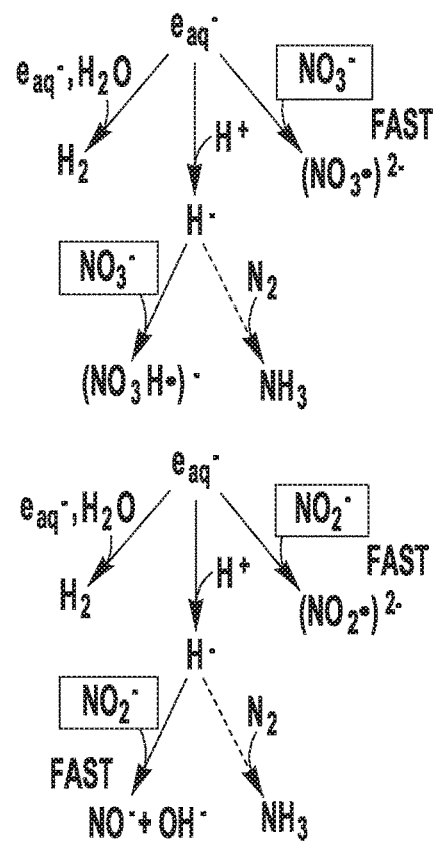
FIG. 13 provides a schematic illustration of the influence of $NO_x$ on $NH_3$ formation in a plasma electrolytic system; in the illustration the potential scavenging reaction pathways of $NO_3^-$ are represented in green and $NO_2^-$ in purple.

The crucial role of solvated electrons and H. in plasma electrolytic synthesis of NH$_3$ was verified by scavenger experiments. The high reactivity of these species allows a controlled impurity or scavenger to be added to the solution which rapidly reacts with and essentially quenches them, impeding their subsequent reaction. This approach is well known in radiation chemistry to elucidate reaction pathways involving solvated electron formation and their reaction byproducts. See Wolff, R. K et al., J. Chem. Phys. 1970, 53, 4211. Relevant to the present invention, scavengers have also been shown to reduce the concentration of solvated electrons generated by a plasma. The inventors initially studied NO$_3^-$ which has a high reactivity for solvated electrons with a measured rate constant for plasma-injected solvated electrons, k=7.0±2.6×10$^9$ M$^{-1}$ s$^{-1}$ (Rumbach, P. et al., Nat. Comm. 2015, 7248) and would be expected to rapidly lower the solvated electron concentration, as depicted in FIG. 13.

Figure 14:
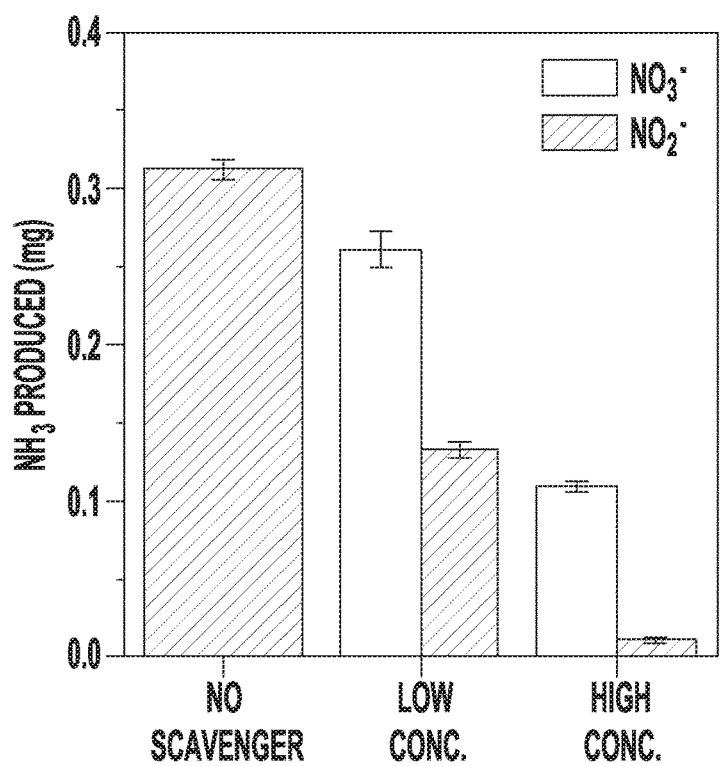
FIG. 14 provides a graph illustrating a comparison between total $NH_3$ produced after 45 minutes at 6 mA for low (10 mM) and high (1 M) concentrations of $NO_3^-$ and $NO_2^-$, and total $NH_3$ produced for the same conditions in the absence of any scavenger.

FIG. 14 shows that the $NH_3$ yield is reduced by the addition of $NO_3^-$, reflecting the effect of scavenging solvated electrons, but the $NO_3^-$ concentration needs to be sufficiently high (10 mM vs. 1 M) to observe ~50% reduction. The complete set of data for all trials is shown in Table 11. The inventors believe this is because 1) $NO_3^-$ competes with $H^+$, which based on radiation chemistry has a similar rate constant for reaction with solvated electrons (k=2.3× $10^{10}$ $M^{-1}$ $s^{-1}$) (Buxton, G. V. et al., J. Phys. Chem. Ref Data 1988, 17, 513-886) and 2) transport limitations which will lower the concentration of $NO_3^-$ at the plasma-liquid interface where the solvated electrons are generated as compared to the bulk.

TABLE 11

Summary of $NH_3$ produced and Faradaic efficiencies by plasma electrolytic synthesis in the presence of $NO_3$ and $NO_2$ scavengers. The concentration of $NO_3$ and $NO_2$ was controlled by $NaNO_3$ and $NaNO_2$. The reaction volume was 20 mL in all cases.

| | $NH_3$ produced (mM) | $NH_3$ produced (mg) | Total charge (mAs) | Faradaic $NH_3$ conc. (mM) | Faradaic efficiency (%) |
|---|---|---|---|---|---|
| 10 mM $NO_3$ | | | | | |
| Trial 1 | 0.779 | 0.265 | 5409 | 0.934 | 83.3 |
| Trial 2 | 0.797 | 0.272 | 5437 | 0.939 | 84.9 |
| Trial 3 | 0.727 | 0.248 | 5402 | 0.933 | 77.9 |
| Average | | 0.261 ± 0.011 | | | 82.0 ± 3.5 |
| 100 mM $NO_3$ | | | | | |
| Trial 1 | 0.553 | 0.188 | 5379 | 0.929 | 59.5 |
| Trial 2 | 0.568 | 0.194 | 5409 | 0.934 | 60.8 |
| Trial 3 | 0.584 | 0.199 | 5402 | 0.933 | 62.6 |
| Average | | 0.194 ± 0.005 | | | 61.0 ± 1.5 |
| 1M $NO_3$ | | | | | |
| Trial 1 | 0.330 | 0.112 | 5419 | 0.936 | 35.3 |
| Trial 2 | 0.314 | 0.107 | 5428 | 0.938 | 33.4 |
| Trial 3 | 0.322 | 0.110 | 5411 | 0.935 | 34.5 |
| Average | | 0.110 ± 0.003 | | | 34.4 ± 0.8 |
| 2M $NO_3$ | | | | | |
| Trial 1 | 0.211 | 0.072 | 5390 | 0.931 | 22.6 |
| Trial 2 | 0.188 | 0.064 | 5392 | 0.932 | 20.1 |
| Trial 3 | 0.136 | 0.046 | 5421 | 0.936 | 14.5 |
| Average | | 0.061 ± 0.012 | | | 19.1 ± 3.9 |
| 10 mM $NO_2$ | | | | | |
| Trial 1 | 0.376 | 0.133 | 5303 | 0.916 | 41.0 |
| Trial 2 | 0.406 | 0.138 | 5338 | 0.922 | 44.1 |
| Trial 3 | 0.389 | 0.133 | 5216 | 0.901 | 43.2 |
| Average | | 0.133 ± 0.005 | | | 42.7 ± 1.5 |
| 1M $NO_2$ | | | | | |
| Trial 1 | 0.026 | 0.009 | 5314 | 0.918 | 2.9 |
| Trial 2 | 0.037 | 0.013 | 5319 | 0.918 | 4.1 |
| Trial 3 | 0.032 | 0.011 | 5030 | 0.869 | 3.7 |
| Average | 0.032 | 0.011 | | | 3.6 ± 5.7 |

The inventors addressed the former issue by also studying $NO_2^-$ which has been found to have a similar reactivity as $NO_3^-$ for plasma-injected solvated electrons, k=5.2±2.6×$10^9$ $M^{-1}$ $s^{-1}$, but reacts close to 500 times faster with H. (Madden, K. P. et al., J. Phys. Chem. Ref. Data 2011, 40, 023103). At the same concentrations as $NO_3^-$, $NO_2^-$ showed much stronger reduction of $NH_3$ production, with almost complete suppression at 1 M (see FIG. 14 and Table 12). These results substantiate that the formation of $NH_3$ occurs through solvated electron chemistry and that one of the key intermediates is H. Previous work on reduction of $N_2$ to $NH_3$ by solvated electrons suggested either a mechanism based on $N_2^-$ or H. (see Zhu, D. et al., Nat. Mater. 2013, 8, 836-841 and Christianson, J. R. et al., J. Phys. Chem. B 2014, 118, 195-203) and while the solvated electrons were generated here by a different approach, our scavenger experiments support $NH_3$ formation through H.

TABLE 12

Summary of one-sample and two-sample t-tests carried out on data sets in Table 11.

One-Sample t on $NH_3$ production
Test of µ = 0 vs µ > 0.00

| | Algebraic Mean | St. Deviation | 95% Lower Bound | Probability |
|---|---|---|---|---|
| No Scavenger | 0.313 | 0.010 | 0.307 | 0.000 |
| 10 mM $NO_3$ | 0.261 | 0.012 | 0.240 | 0.000 |
| 10 mM $NO_2$ | 0.133 | 0.005 | 0.124 | 0.000 |
| 1M $NO_3$ | 0.110 | 0.003 | 0.105 | 0.000 |
| 1M $NO_2$ | 0.011 | 0.002 | 0.008 | 0.005 |

Two-Sample t on $NH_3$ production
Test of $\mu_1 - \mu_2 = 0$

| | Difference | 95% Lower Bound | 95% Upper Bound | Probability |
|---|---|---|---|---|
| None vs. 10 mM $NO_3$ | 0.051 | 0.018 | 0.085 | 0.023 |
| 10 mM $NO_3$ vs. 10 mM $NO_2$ | 0.128 | 0.095 | 0.162 | 0.004 |
| None vs. 1M $NO_3$ | 0.203 | 0.195 | 0.211 | 0.000 |
| 10 mM $NO_3$ vs. 1M $NO_3$ | 0.152 | 0.120 | 0.184 | 0.002 |
| 1M $NO_3$ vs. 1M $NO_2$ | 0.099 | 0.093 | 0.105 | 0.000 |

Although the single-compartment cell was closed and purged with Ar or $N_2$ to remove background ambient air, the oxidation process at the Pt anode in our system evolves $O_2$ gas which could serve as an unintended impurity during the experiments in several ways. The presence of $O_2$ in the plasma could lead to reaction with gas-phase electrons and reduce their flux to the solution surface, thus, decreasing the concentration of solvated electrons produced. See Rumbach, P. et al., J. Phys. D 2015, 48, 424001. In addition, $O_2$ could react with $N_2$ in the plasma to produce $NO_x$ in the gas phase, as historically demonstrated by the Birkeland-Eyde process, and its subsequent dissolution forms $NO_2^-$ and $NO_3^-$ in solution which would affect solvated electron chemistry via the aforementioned scavenging reactions (see FIG. 13). The relative similarity of $NH_3$ yields in the split and single cells show that the former is not a significant issue.

Figure 15:
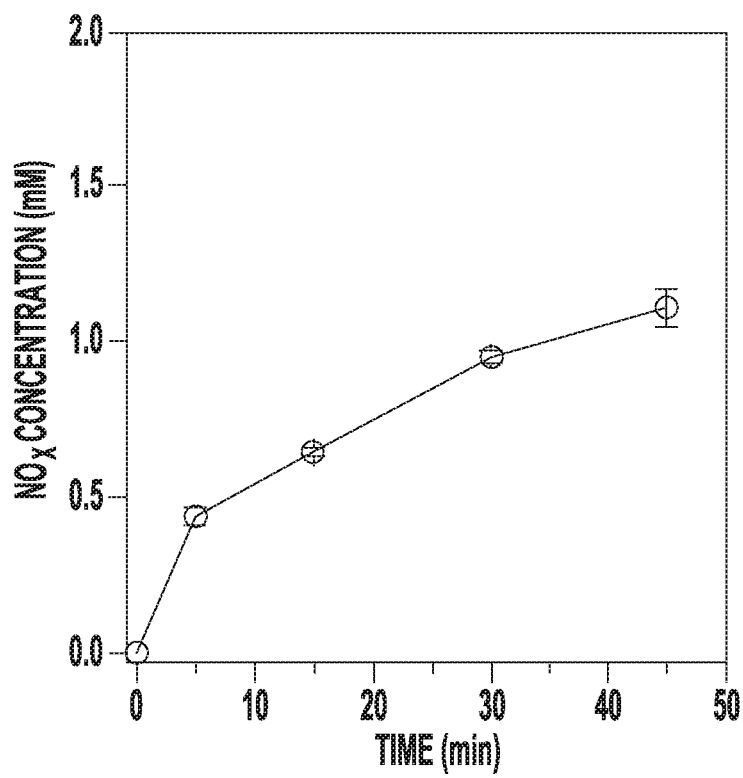
FIG. 15 provides a graph illustrating $NO_x$ concentration measured as a function of processing time at 6 mA.
Figure 16:
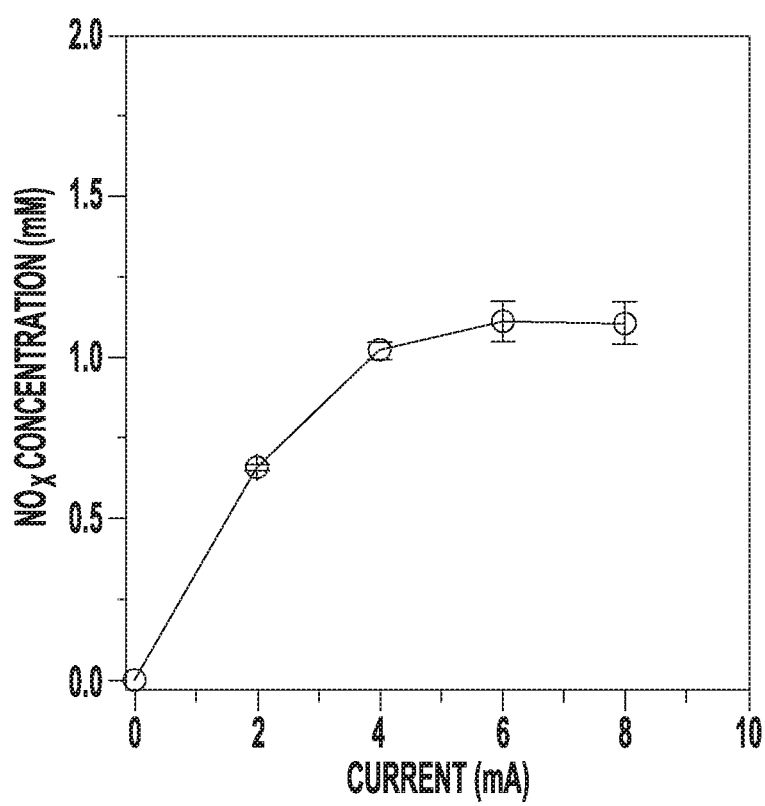
FIG. 16 provides a graph illustrating $NO_x$ concentration measured as a function of current after 45 minutes.

To address the latter, the inventors measured the $NO_x$ generated in solution for our plasma electrolytic system. FIG. 15 and FIG. 16 show the $NO_x$ concentration as a function of process time at 6 mA and as a function of current after 45 minutes, respectively. The complete set of data for all trials is shown in Table 13.

TABLE 13

Summary of $NO_x$ produced by plasma electrolytic synthesis after different processing time and at different currents. The current was 6 mA in the time trials, the processing time was 45 minutes in the current trials, and the reaction volume was 20 mL in all cases.

| | $NO_x$ produced (mM) | | | |
|---|---|---|---|---|
| | t = 5 min | t = 15 min | t = 30 min | t = 45 min |
| Trial 1 | 0.412 | 0.654 | 0.951 | 1.18 |
| Trial 2 | 0.438 | 0.659 | 0.929 | 1.09 |
| Trial 3 | 0.468 | 0.629 | 0.971 | 1.06 |
| Average | 0.439 | 0.647 | 0.951 | 1.11 |

| | $NO_x$ produced (mM) | | | |
|---|---|---|---|---|
| | I = 2 mA | I = 4 mA | I = 6 mA | I = 8 mA |
| Trial 1 | 0.653 | 1.04 | 1.18 | 1.13 |
| Trial 2 | 0.671 | 0.990 | 1.09 | 1.03 |
| Trial 3 | 0.658 | 1.03 | 1.06 | 1.16 |
| Average | 0.661 | 1.02 | 1.11 | 1.11 |

Figure 17:
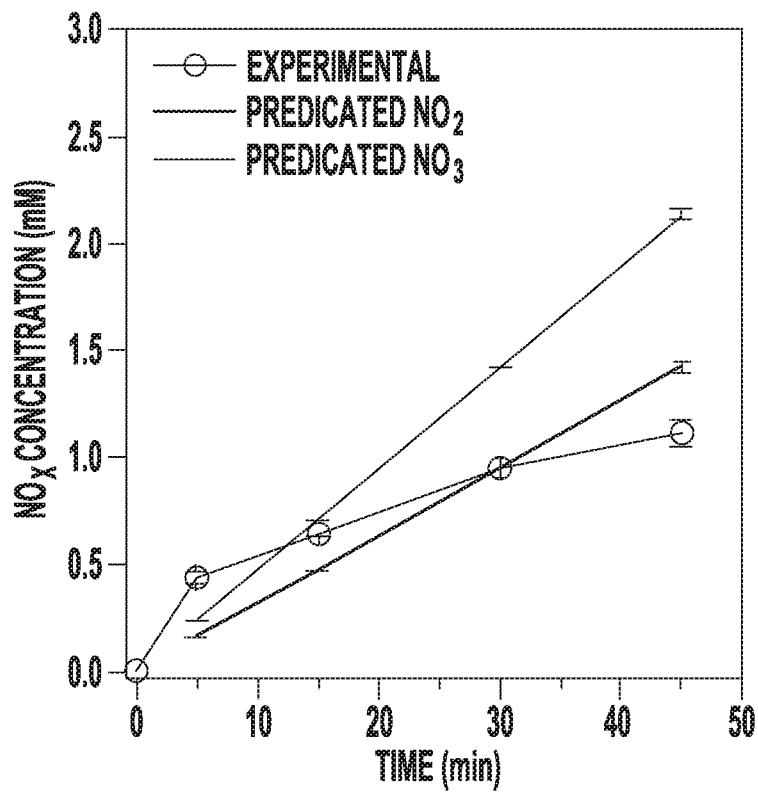
FIG. 17 provides a graph illustrating a comparison of experimentally produced $NO_x$ (empty circle data points with black solid line for guide) with predicted $NO_2$ and $NO_3$ based on $O_2$ gas evolved at anode in a plasma electrolytic system as a function of process time.
Figure 18:
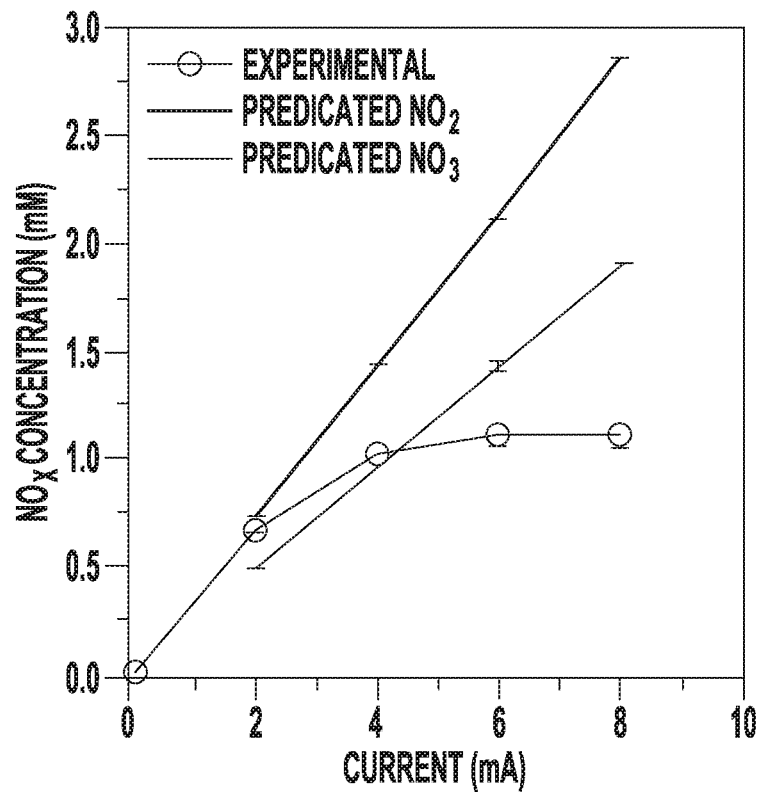
FIG. 18 provides a graph illustrating a comparison of experimentally produced $NO_x$ (empty circle data points with black solid line) with predicted $NO_2$ and $NO_3$ based on $O_2$ gas evolved at anode in a plasma electrolytic system as a function of current.

The $NO_x$ concentrations were not found to be large enough to substantially scavenge and quench the solvated electrons (see FIG. 14). The inventors verified that the $NO_x$ formation was from 02 gas evolution at the Pt anode by also carrying out these measurements in the split cell which showed no detectable amount of $NO_x$. This was further corroborated by comparing the measured $NO_x$ with an expected amount from the faradaic yield of 02 and assuming that all of it reacts with $N_2$ (in the plasma) to form either $NO_2$ or $NO_3$ (see FIG. 17 and FIG. 18).

Figure 5:
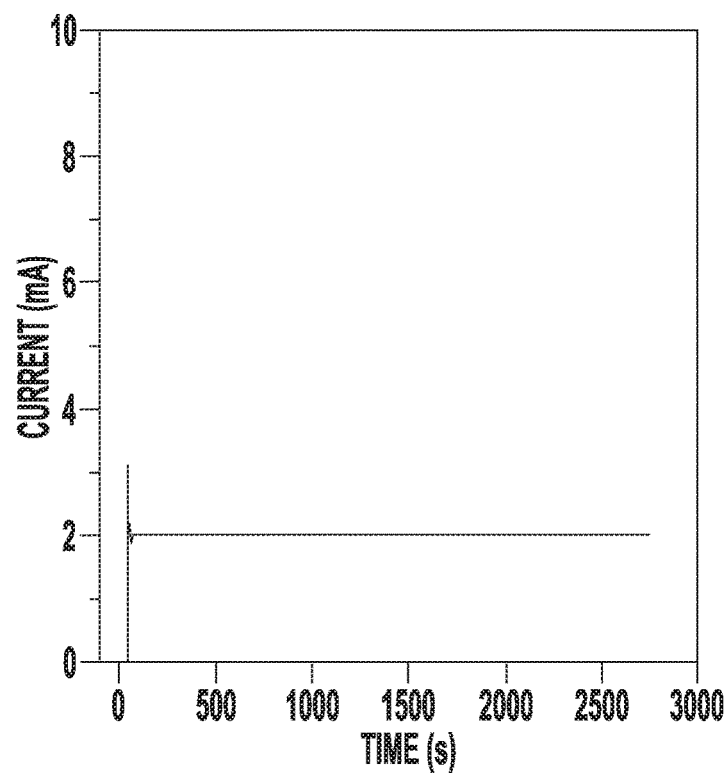
FIG. 5 provides a graph illustrating representative current waveforms measured in plasma electrolytic system during $NH_3$ synthesis, where the total charge is 5448 mAs.
Figure 6:
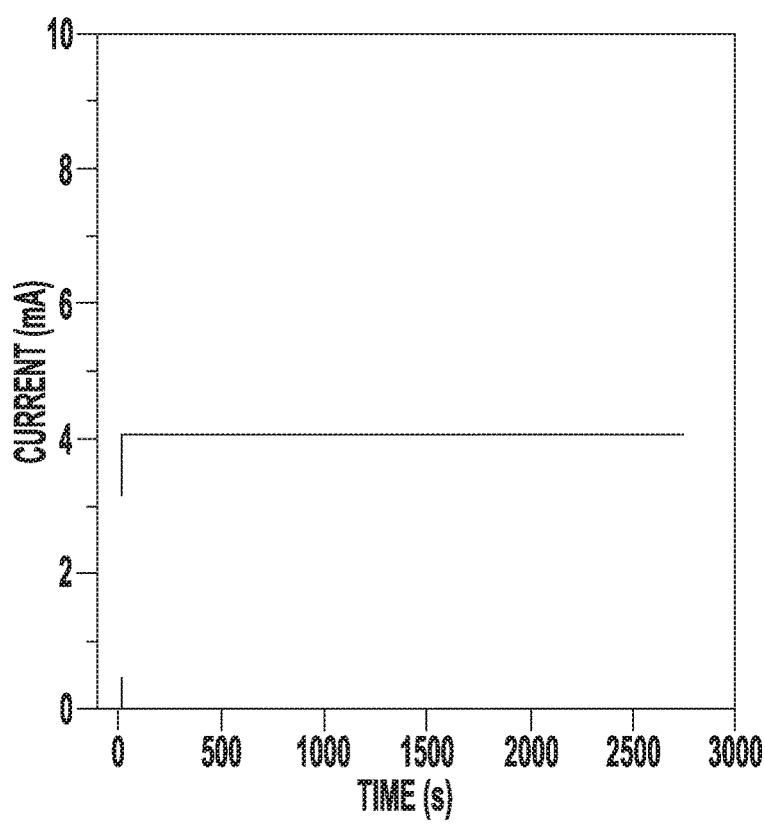
FIG. 6 provides a graph illustrating representative current waveforms measured in plasma electrolytic system during $NH_3$ synthesis, where the total charge is 10858 mAs.
Figure 7:
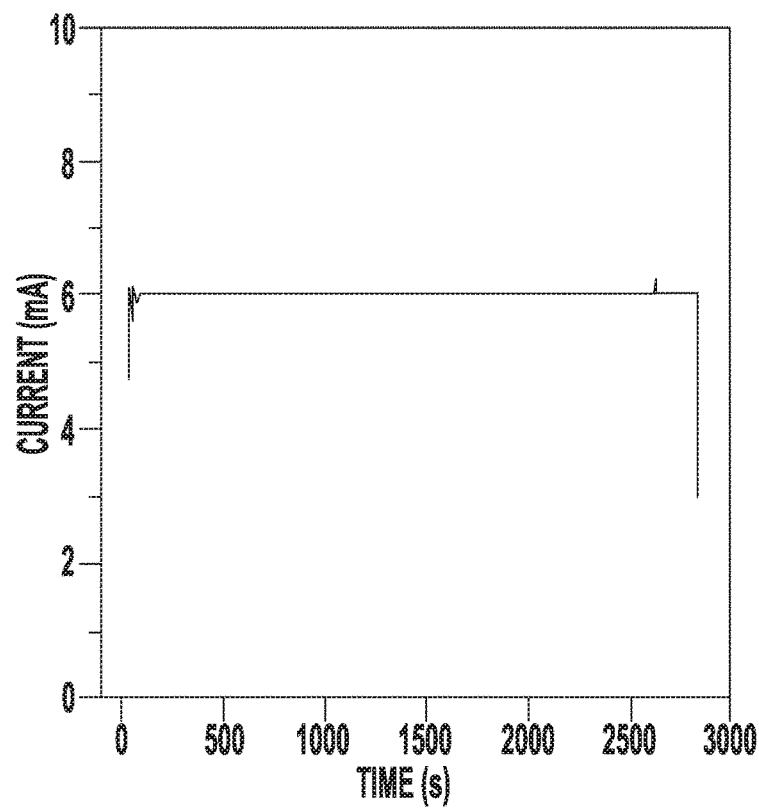
FIG. 7 provides a graph illustrating representative current waveforms measured in plasma electrolytic system during $NH_3$ synthesis, where the total charge is 16717 mAs.
Figure 8:
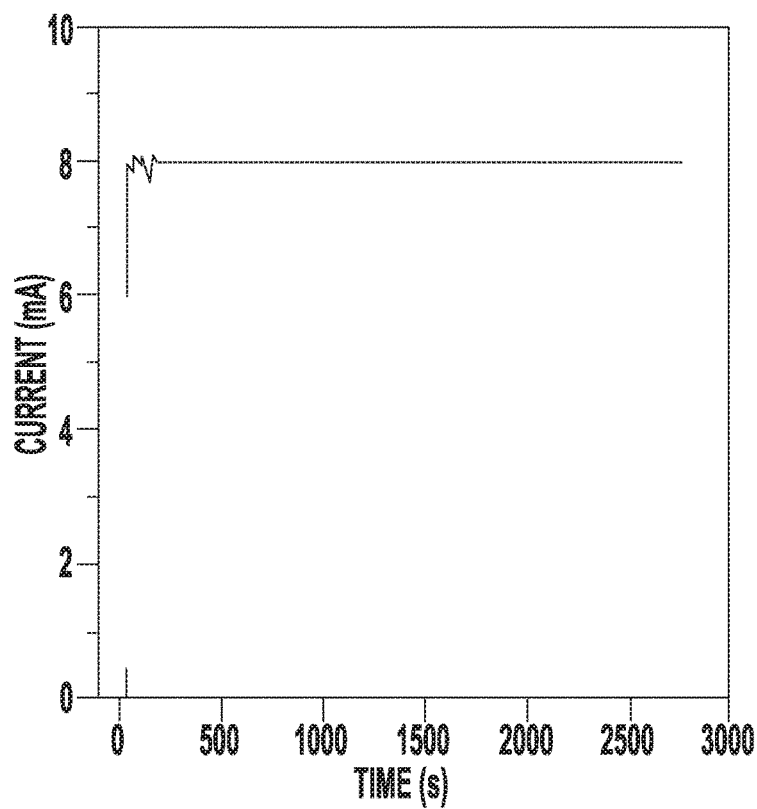
FIG. 8 provides a graph illustrating representative current waveforms measured in plasma electrolytic system during $NH_3$ synthesis, where the total charge is 21647 mAs.

Given that $O_2$ gas evolution and subsequent $NO_x$ formation does not likely have a large impact on $NH_3$ production in our specific reactor, and that our results collectively point to solvated electron concentration, H+ concentration, and H. concentration as all being important, the inventors speculate that there is a combination of factors that lead to the decreased $NH_3$ yield and faradaic efficiency as the current is increased above 2 mA, as shown in FIG. 4 and FIG. 5. The increased production of solvated electrons and their reaction may deplete the H+ at the plasma-liquid interface such that there is insufficient H+ for $NH_3$ formation. While H+ may be present in the bulk from the initial acid and water oxidation at the anode, transport limitations could prevent the H+ from reaching the interface. As discussed, low concentrations of H+, and high concentrations of H. would result in higher rates of HER. Thus, at higher currents and solvated electron concentrations, the HER becomes significant and reduces the selectivity towards $NH_3$ formation. The change in rate with time shown in FIG. 4 supports a potential interplay between kinetics and transport that needs further investigation. This interplay has been observed before in a similar reactor in our laboratory, where the goal was to make silver nanoparticles. There, a minimal concentration of 150 mM silver ions was needed to overcome transport limitations in the cell.

While the exploration of the kinetic and transport parameters is subject to future studies, the inventors have shown that the plasma hybrid system is capable of highly efficient $NH_3$ production. compare our results with recent electrochemical demonstrations at room temperature and pressure which use water as the proton source for ammonia generation in Table 14.

TABLE 14

Comparison of electrically-driven $N_2$ reduction to ammonia demonstrations at atmospheric temperatures and pressures.

| Reference | Production Rate (mg/hr) | Demonstration Size (geometric area, catalyst loading) | Faradaic Efficiency (%) |
|---|---|---|---|
| Shi 2017 | 0.021 | 1 $cm^2$ area, 1 $mg/cm^2$ | 8% |
| Kong 2017 | 0.0038 | 6.25 $cm^2$, 1 $mg/cm^2$ | 10% |
| Zhou 2017 | 0.000063 | 0.25 $cm^2$, 146 $ug/cm^2$ | 60% |
| Bao 2017 | 0.00016 | 1 $cm^2$, 0.33 $mg/cm^2$ catalyst | 4% |
| Our Study | 0.44 | n/a, catalyst free | 100% |

The inventors note that only studies which utilize a non-nitrogen control gas are included, for a fair comparison. The inventors also only include the highest faradaic efficiency recorded in each study. The comparison reveals that the process described in this study has the highest faradaic efficiency while maintaining high production rate, which is over an order of magnitude higher compared to other electrochemical methods at similar reaction geometric areas. Additionally, recent relevant work by Kong et al. demonstrated $NH_3$ production in a membrane-based device at 1.7 cell voltage allowing an estimate of power consumption. It was estimated that a power consumption of 8000 kwh/kg $NH_3$ at the highest 10% faradaic efficiency is achieved in the first hour of operation. While the present invention has a high power consumption (estimated to be 2700 kwh/kg $NH_3$ produced at 2 mA for 45 minutes) compared to H-B, which requires about 9-13 kWh/kg of $NH_3$ produced, the inventors note that the present invention doesn't require catalyst, high pressures, or temperatures and can operate at a small scale. This makes the present invention a promising technology for distributed production with high renewable energy resources.

The inventors demonstrate high faradaic efficiencies (up to 100%) are possible at ambient temperature and pressure for $NH_3$ production in liquid water using a catalyst-free, electrolytic hybrid plasma system which contained $N_2$ in the plasma gas. Scavenger experiments show that $NO_x$ compounds reduce the $NH_3$ production, and show that this process occurs through a mechanism involving H. and solvated electrons. Experiments conducted at different pH, show that H+ concentration is also significantly important to the overall production and efficiency. A comparison of this technology with other ammonia generation alternatives suggests that this is a promising approach for distributed, renewable $NH_3$ production.

Example 1: Ammonia Synthesis Using Plasma Electrochemical Cell

Plasma Electrochemical Cell Setup

The custom designed electrochemical cell contains a stainless steel capillary tube (Restek inc, 1/16" O.D., 0.02" I.D. and 10 cm long) that is connected to a negative high voltage power supply (Gamma High Voltage, RR15-10R) through a variable ballast resistor (0.25-1 MΩ) in series as the cathode. A Pt foil (Alfa Aesar, 99.9% purity, 0.001" thick) was wired through a 500Ω resistor to ground to form the anode. The electrodes, along with two purging tubes were fed into the reactor cell through a custom polytetrafluoroethylene (PTFE) lid that ensured that the reactor cell is isolated from ambient gasses. One of the purging tubes was used for bubbling nitrogen through the solution and the other served as exhaust. The capillary tube was set at a high voltage and then lowered into the cell through the lid until the microplasma ignited close to the solution surface. All experiments were performed at a constant current mode of the power supply and in 20 mL of electrolyte solution.

Some control experiments were performed using a H-shaped electrochemical cell. A representative drawing of the cell is shown in FIG. 10. In this cell, the cathode and the anode chambers were separated with a glass frit. Each of these two compartments are sealed with PTFE lids. The lids are designed such that they allow the insertion of a pair of purging tubes and an electrode in the respective half-cells. In general, the split-cell experiments were operated using similar plasma initiation protocols as that of the previously described single cell. However, the presence of the frit usually increases the resistance of the circuit and thus needs a relatively higher operating voltage for the same current. Each half-cell contained 20 mL electrolyte solution.

Calculation of Charge Transferred and Power Yield

The current passing through the microplasma and the electrolyte was determined by measuring and dividing the voltage drop across the 500Ω resistor, every 30 ms. This data was recorded continuously for the duration of each experiment using a custom LabView interface between the computer and the voltmeter. The obtained current vs. time plot was then integrated to calculate the total amount of charge transferred during each individual experiment.

Sample Preparation and Treatment

Unless stated otherwise, pH 3.5 sulfuric acid solution was prepared from 18.2 MO water and sulfuric acid (Sigma Aldrich, 99.999% purity) and 20 mL used for each sample solution. The sample solution is then bubbled with nitrogen (Airgas, 99.99+%) for 30 minutes ensuring the removal of any dissolved gasses and to fill the container headspace with $N_2$. The purging tube was then raised out of the sample solution and the Pt metal anode lowered into the solution. 60 sscm of $N_2$ was then flowed through the capillary tube cathode and a DC microplasma formed at the surface of the sample solution. Standard conditions of operation were 45 minutes of plasma treatment at 6 mA unless otherwise noted. Experiments were also performed with varying concentrations of $NaNO_3$ and $NaNO_2$ (Acros Organics, purity 99+%) as radical scavengers.

In order to ensure that during the plasma-electrochemical process all ammonia was produced in the electrolyte, a secondary trap-cell was incorporated. The reaction effluents were passed through a trap-cell containing $H_2SO_4$ solution of pH=2. The trap-cell contents were later analyzed for ammonia.

Ammonia Identification

Figure 19:
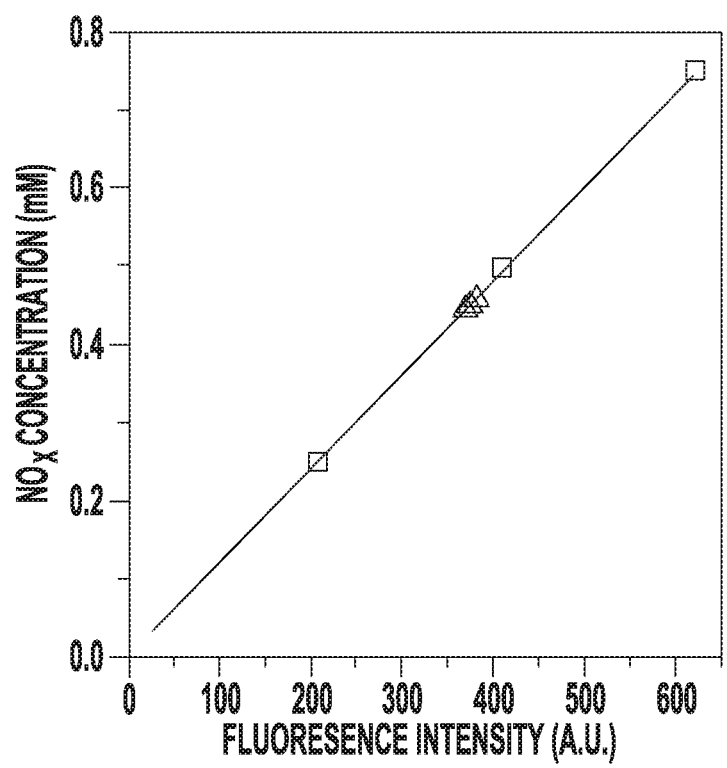
FIG. 19 provides a graph illustrating representative fluorescence assay calibration used to determine $NH_3$ produced, where the empty black square data points correspond to control solutions and filled blue triangle data points correspond to solutions synthesized in a plasma electrolytic system.
Figure 20:
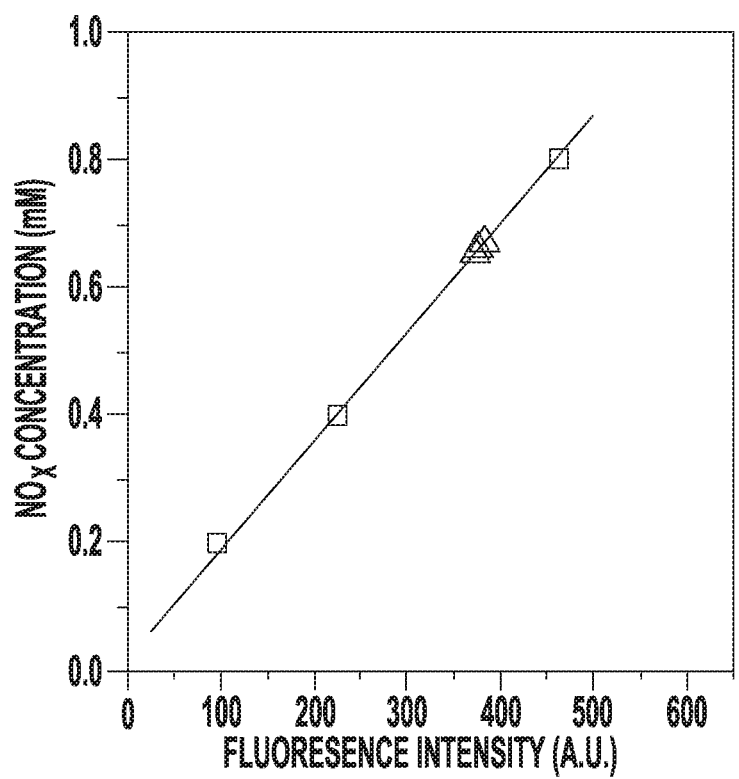
FIG. 20 provides a graph illustrating representative fluorescence assay calibration used to determine $NO_x$ produced, where the empty black square data points correspond to control solutions and the filled blue triangle data points correspond to solutions synthesized in a plasma electrolytic system.

Immediately following plasma treatment experiments, 2 mL electrolyte was stored in a $N_2$ purged, sealed vial and refrigerated until ammonia analysis. The ammonia assay (BioAssay Systems, QuantiFluo DNH3-200) utilized an o-phthalaldehyde method and quantified with fluorescence at wavelengths of 360/450 nm. The fluorescent intensity of the assay has a lower detection limit at 12 μM and increases proportionally with ammonia concentration in the sample solution. The fluorescence of the assay is calibrated using four known solutions of basic water containing ammonium hydroxide at 0.001, 0.01, 0.1 and 1 M for every batch of measurements. A sample dataset of assay calibration and $NH_3$ concentration calculations can be found in FIG. 19 and FIG. 20.

Statistical Analysis

All data are represented as the mean of a data set±the standard error which was calculated from the variance in the raw data within two standard deviations of the mean (approximately 95% confidence interval). Statistical differences between data sets were determined using a two-sample t-test (Minitab). To determine if a data set was nonzero, a one sample t-test was employed. All t-tests were performed using Minitab Software Version X. The results of all of the t-tests and the sample size for each data set is tabulated. For all statistical tests, a threshold value of α=0.05 was chosen, and a p-value at or below 0.05 indicated significance.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of ammonia synthesis comprising steps of
   1) applying a current to an electrochemical cell to create a current flow, wherein the electrochemical cell comprises a metal anode within an electrolytic solution and a hollow plasma generating cathode that is separated from the surface of the electrolytic solution by a predetermined spacing;
   2) flowing nitrogen gas through the hollow plasma generating cathode into the predetermined spacing and the electrolytic solution;
   3) forming a plasma within the predetermined spacing as a result of the current flow, wherein the plasma includes the nitrogen gas; and
   4) solvating electrons in the electrolytic solution as a result of the current flow to form ammonia from the nitrogen gas and water present in the electrolytic solution.

2. The method of claim 1, wherein the method is carried out at about 25 degree Celsius (° C.) and about 1 atmospheric pressure (atm).

3. The method of claim 1, wherein the electrolytic solution has a pH of 5 or less.

4. The method of claim 1, wherein the current ranges from 1 mA to 8 mA.

5. The method of claim 1, wherein the no plasma is a microplasma.

6. The method of claim 1, wherein the metal anode is a platinum anode.

7. The method of claim 1, wherein the hollow plasma-generating cathode comprises a stainless steel tube.

8. The method of claim 1, wherein the nitrogen gas is supplied at a flow rate of about 125 milliliter (mL) per minute.

9. The method of claim 1, wherein forming the ammonia from the nitrogen and water comprises forming the ammonia at an ammonia production rate of about 0.44 milligram per hour (mg/hour).

10. The method of claim 1, wherein forming the ammonia from the nitrogen and water is carried out at a faradaic efficiency of about 100%.

* * * * *